(12) United States Patent
Arun

(10) Patent No.: US 11,794,714 B2
(45) Date of Patent: Oct. 24, 2023

(54) CONTROL ALGORITHM AND INTRUSIVE STATE-DETECTION DIAGNOSTIC FOR SENSORLESS DRIVELINE DISCONNECT

(71) Applicant: Rivian IP Holdings, LLC, Irvine, CA (US)

(72) Inventor: Aravind Arun, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/710,862

(22) Filed: Mar. 31, 2022

(65) Prior Publication Data

US 2023/0080481 A1 Mar. 16, 2023

Related U.S. Application Data

(60) Provisional application No. 63/243,161, filed on Sep. 12, 2021.

(51) Int. Cl.
| | |
|---|---|
| *B60W 10/08* | (2006.01) |
| *B60K 17/35* | (2006.01) |
| *B60K 17/356* | (2006.01) |
| *B60W 10/02* | (2006.01) |

(52) U.S. Cl.
CPC ........... *B60W 10/08* (2013.01); *B60K 17/356* (2013.01); *B60K 17/3515* (2013.01); *B60W 10/02* (2013.01); *B60W 2510/081* (2013.01); *B60W 2520/28* (2013.01); *B60W 2710/083* (2013.01)

(58) Field of Classification Search
CPC ................. B60W 10/08; B60W 10/02; B60W 2510/081; B60W 2520/28; B60W 2710/083; B60K 17/3515; B60K 17/356
See application file for complete search history.

(56) References Cited

U.S. PATENT DOCUMENTS

| | | | | |
|---|---|---|---|---|
| 4,651,142 | A * | 3/1987 | Klatt | ................. B60W 30/1819 180/278 |
| 8,282,526 | B2 | 10/2012 | Heap et al. | |
| 10,069,445 | B2 * | 9/2018 | Yoshiura | ............. H02P 23/0004 |
| 10,513,251 | B2 | 12/2019 | Lee et al. | |
| 2005/0040002 | A1 * | 2/2005 | Teraoka | .................. F16D 23/06 192/53.34 |

(Continued)

FOREIGN PATENT DOCUMENTS

| | | | | |
|---|---|---|---|---|
| DE | 102005026874 A1 * | 12/2006 | ........... B60K 17/356 |
| DE | 102015119285 A1 | 5/2016 | |

OTHER PUBLICATIONS

International Search Report and Written Opinion received for PCT Patent Application No. PCT/US2022/043251, dated Dec. 23, 2022, 11 pages.

*Primary Examiner* — Tisha D Lewis
(74) *Attorney, Agent, or Firm* — Haley Guiliano LLP

(57) ABSTRACT

A sensorless clutch state feedback method is provided including a driveline disconnect. To engage the sensorless disconnect, respective speeds of a motor assembly and the sensorless disconnect are synchronized to within a speed delta threshold of each other, a control system facilitates the engagement of the motor assembly and the sensorless disconnect, and the control system determines the success of the engagement by the motor speed response of the motor assembly (e.g., whether the presence of a load is detected).

22 Claims, 18 Drawing Sheets

(56) References Cited

U.S. PATENT DOCUMENTS

| | | | |
|---|---|---|---|
| 2006/0266569 A1* | 11/2006 | Fujiwara | B60W 30/18027 180/242 |
| 2008/0195287 A1* | 8/2008 | Janssen | F16D 48/06 701/67 |
| 2013/0274969 A1* | 10/2013 | Wang | B60W 20/00 903/946 |
| 2021/0053553 A1 | 2/2021 | Akanda et al. | |
| 2022/0242252 A1* | 8/2022 | Wang | B60L 15/20 |
| 2023/0022383 A1* | 1/2023 | Madineni | G01C 21/3815 |
| 2023/0035581 A1* | 2/2023 | Madineni | B60K 7/0007 |

* cited by examiner

CONTROL ALGORITHM AND INTRUSIVE STATE-DETECTION DIAGNOSTIC FOR SENSORLESS DRIVELINE DISCONNECT

CROSS-REFERENCE TO RELATED APPLICATIONS

This application claims priority to U.S. Provisional Patent App. Ser. No. 63/243,161, filed on Sep. 12, 2021, the entire contents of which are hereby expressly incorporated by reference in their entirety.

INTRODUCTION

Disconnects such as clutches are used to couple and decouple vehicle driveline components. For example, in electric vehicles with multiple motors, one or more motors and driveline components may be decoupled from the wheels using a disconnect to reduce energy losses due to non-conservative forces (e.g., friction) between rotating mechanical components. By decoupling components during appropriate vehicle conditions, range and efficiency may be increased without impacting vehicle performance. For example, disconnects may couple motors to their corresponding wheels to make a rear axle available in high-torque demand scenarios and/or decouple them in more range/efficiency-focused driving modes to reduce energy losses in the mechanical components.

In some embodiments, to mechanically couple components using a disconnect (e.g., a two-way controllable mechanical diode (CMD) clutch), struts on a pocket plate must extend out and engage in notches on a notch plate. In some embodiments, the notch plate is connected to a gearbox output shaft, while the pocket plate is connected to a half shaft (e.g., driveline) and wheel. A linear translator controlled by a vehicle dynamics module (e.g., an electronic control unit) may be used to actuate the disconnect.

To lock the clutch plates (e.g., the pocket plate and notch plate) without damaging these components, their speeds should be close to each other (e.g., less than a 20 RPM delta). The specific delta threshold for a disconnect may depend on the type of disconnect and the specifications of the disconnect. Furthermore, it is desirable to quickly enable dynamic actuation of a disconnect at any vehicle speed and also to limit discomfort (e.g., a jolt in the vehicle's mechanics) felt by the driver.

Some disconnect devices do not contain any sensors for clutch state feedback. If torque is applied to a disconnect device in a partially engaged state, the disconnect may be damaged. For example, if a strut is only partially engaged with a notch (e.g., it is resting on the notch opening as opposed to being seated at the bottom of the notch), it may mechanically deform the notch opening. In addition, a partially engaged disconnect may slip under high torque conditions, which may lead to asymmetrical delivery of torque (e.g., in a vehicle using dual motors to independently drive the left and right wheels of a vehicle). Accordingly, it is desirable to detect the disconnect state to prevent damage to the disconnect and/or ensure proper torque delivery.

SUMMARY

In accordance with some embodiments of the present disclosure, control logic is used to control the speed of disconnect components prior to engagement to facilitate a quick and successful engagement of a disconnect. For example, the control logic may be used to quickly synchronize a motor to a corresponding wheel speed (e.g., within a certain number of RPMs of each other) before actuating the disconnect (e.g., via a linear translator). In some embodiments, the control logic may determine when the motor and wheel speeds are synchronized (e.g., achieve a speed delta) by comparing the speed difference to a diagnostic threshold over a statistically significant time window. It will be understood that the diagnostic threshold may represent a maximum allowable steady-state error. In some embodiments, applying the diagnostic threshold may include implementing a counter that counts up or down based on a size of an error in the speed of the motor.

In some embodiments, a closed-loop speed controller is implemented on a vehicle to control motor speed in such a way that the speeds of the inboard and outboard clutches are matched prior to actuating a disconnect to enter the locked state. In some embodiments, the front and/or rear wheels of the vehicle are independent controlled by separate motors and separate disconnects are used to couple and decouple the motors to their respective wheels. For example, both rear motors may be coupled and decoupled from their respective wheels at the same time. A vehicle dynamics module may be used to determine when to couple and decouple the rear motors and implement the closed-loop speed controller for each motor to control their speeds. Due to the high torsional stiffness of the inboard components (e.g., rotor, gearbox), the controller gains may be calibrated based on the feedback signal sampling rate and the empirically determined lumped inertia of the inboard components to achieve the desired response characteristics. For example, the speed controller may be calibrated to match the inboard and outboard clutch speeds to within 20 RPM in less than 200 ms from when the controller receives the command to engage the disconnects. This enables quick dynamic actuation of a disconnect at any vehicle speed.

In accordance with some embodiments of the present disclosure, control logic is used determine the state of a disconnect (e.g., locked or unlocked state) using available vehicle components or signals. For example, motor speed and wheel speed may be evaluated over a period of time to determine if a disconnect is locked. As another example, a torque impulse may be applied with the motor, and the motor response may be evaluated to determine if the disconnect is locked.

In some embodiments, a vehicle dynamics module is used to determine the state of one or more disconnect devices. A vehicle dynamics module may have access to the following signals for each motor and corresponding wheel or wheels: motor speed, wheel speed, and motor torque feedback (e.g., calculated from motor current). In some embodiments, the vehicle dynamics module determines that a disconnect is locked if the signals satisfy one or both of the following conditions:

Condition 1: Motor speed and wheel speed are well-correlated over a period of time (e.g., a statistically significant number of samples).

Condition 2: Motor speed response to torque indicates the presence of a load on the gearbox output shaft (e.g., full driveline and vehicle inertia).

In some embodiments, failure of Condition 1 alone is sufficient to immediately determine that the disconnect is in the "Unlocked" state. If the measured motor and wheel speeds deviate significantly in response to an input torque (i.e., they are decoupled), the disconnect must be unlocked.

In some embodiments, Condition 1 being satisfied is necessary to confirm the "Locked" state, but it may not be sufficient alone to determine that the disconnect is in the "Locked" state. Accordingly, Condition 1 may be supplemented with Condition 2. To detect whether there is a load on the gearbox output shaft (Condition 2), a reduced-order observer may be implemented to estimate the torque transmitted through the half-shaft connecting the gearbox output to the wheel. The full driveline (including the half-shaft) will be an observable system when: (a) there is consistent positive contact in the gearbox lash zone and (b) the torque-bearing set of struts on the pocket plate have fully engaged into the notch plate. To trigger both conditions as quickly as possible, a speed differential may be introduced between the clutches that will allow the system to clear the "combined" (disconnect+gearbox) lash zone. Therefore, when engaging a driveline (e.g., a rear driveline), the vehicle dynamics module will control the motor speed to a target speed differential (e.g., smaller than 20 RPM) from the wheel speed while attempting to lock the clutches.

While the clutches are being actuated, the reduced-order observer will rely on known driveline parameters to estimate the load torque on the gearbox output shaft. Any high frequency fluctuation in the load torque above the viscous drag of the driveline components will indicate that there is a full torque transmission path from the wheel to the inboard components (rotor+gearbox), and therefore the clutches must be locked.

In some embodiments, the target speed delta during clutch engagement is set to satisfy two competing priorities:

Confirmation Duration: To ensure a consistently fast, seamless transition (e.g., from front wheel drive to four wheel drive), the speed differential must be high enough to minimize the time taken for each torque-bearing surface to traverse the worst-case angular displacement before making contact with its mating surface. This worst-case displacement is dictated by the angular spacing of the notches.

Perceptible Vehicle-Level Jerk: Higher speed delta magnitudes will result in higher momentum transfer when the engagement surface makes contact with its mating surface, which will manifest itself as a "jerk" or sudden impulse.

In some embodiments, the controller performance may be optimized iteratively to achieve the best possible compromise between these attributes. The optimization may be performed based on modeling of the vehicle components and/or empirical data. In some embodiments, the systems and methods disclosed herein determine the speed delta by comparing the vehicle speed to a threshold and, when the vehicle speed is below the threshold, selecting a first speed delta as the speed delta. In some embodiments, the vehicle speed may be above the threshold, in which case systems and methods select a second speed delta as the speed delta, where the second speed delta is greater than the first speed delta.

The systems and methods described herein engage a sensorless disconnect by controlling a motor speed to achieve a speed delta, facilitating engagement of the disconnect, monitoring a motor speed response to the engagement, and determining whether the engagement is successful based on the motor speed response. In some embodiments, the systems and methods may utilize control logic, a control system, processing circuitry (e.g., control circuitry), memory, power electronics, and any other suitable component to determine the state (e.g., locked or unlocked) of the disconnect. In some embodiments, the two-way CMD clutch may include a pocket plate, which couples to a half-shaft (e.g., driveline) and wheel, and a notch plate, which couples to a gearbox output shaft. It will be understood that the outboard and inboard plates may be oriented in any suitable manner. In some embodiments, to facilitate engagement of the disconnect (e.g., the two-way CMD clutch), struts from the pocket plate are actuated to extend out and lock into the notches of the notch plate once the respective speeds of the outboard and inboard plates are within a speed delta threshold (e.g., 15 RPM) of each other. It will be understood that the speed delta may be based on a vehicle speed. In some embodiments, to confirm the disconnect is in the "Locked" state, the control system may send a torque command to the motor assembly to monitor a motor speed response. If the respective speeds of the motor assembly and wheel approximately match (e.g., a load is detected on the gearbox output shaft), the control system confirms the disconnect is in the "Locked" state. If the respective speeds of the motor assembly and wheel differ significantly (e.g., a load is not detected on the gearbox output shaft), the control system determines the disconnect is in the "Unlocked" state.

In some embodiments, a successful engagement may not be determined based on the motor speed response, in which case the systems and methods disclosed herein apply a torque impulse to the motor, determine an impulse motor speed response to the torque impulse, and determine whether the engagement is successful based on the impulse motor speed response. In some embodiments, determining the success of the engagement may include determining a presence of a load connected to the disconnect.

In some embodiments, the systems and methods disclosed herein receive a wheel speed and determine a target motor speed based on the wheel speed and speed delta. In some embodiments, controlling the motor speed to achieve the speed delta may include controlling the motor speed to achieve the determined target motor speed. In some embodiments, the target motor speed may correspond to a speed less than the wheel speed.

The foregoing techniques enable independent control over, for example, left and right disconnects in a vehicle. In addition, they provide techniques for detecting disconnect state without a direct disconnect sensor via, for example, intrusive diagnostic.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION OF DRAWINGS

In one embodiment, the present disclosure relates to a sensorless clutch state feedback method that utilizes control logic, a control system, processing circuitry (e.g., control circuitry), memory, power electronics and any other suitable component to determine the state of (e.g., locked or unlocked) and successfully engage a two-way CMD clutch. In some embodiments, the two-way CMD clutch includes a pocket plate, which couples to a half-shaft (e.g., driveline) and wheel, and a notch plate, which couples to a gearbox output shaft. It will be understood that the pocket and notch plates may be oriented in any suitable manner (e.g., the pocket plate coupling to the gearbox output shaft and the notch plate coupling to the half-shaft and wheel). To actuate the disconnect (e.g., the two-way CMD clutch), struts from the pocket plate extend out and lock into the notches of the notch plate once the respective speeds of the outboard and inboard plates are within a speed delta threshold (e.g., 15 RPM) of each other. In some embodiments, to confirm the disconnect is in the "Locked" state, a motor speed response to the engagement is monitored. In some embodiments, to confirm the disconnect is in the "Locked" state, the control system sends a torque command to the motor assembly to monitor a motor speed response. If the respective speeds of the motor assembly and wheel approximately match, and the control system furthermore detects the presence of a load on the gearbox output shaft (e.g., via a reduced-order observer), the control system confirms the disconnect is in the "Locked" state. If the respective speeds of the motor assembly and wheel differ significantly, the control system determines the disconnect is in the "Unlocked" state.

Figure 1:
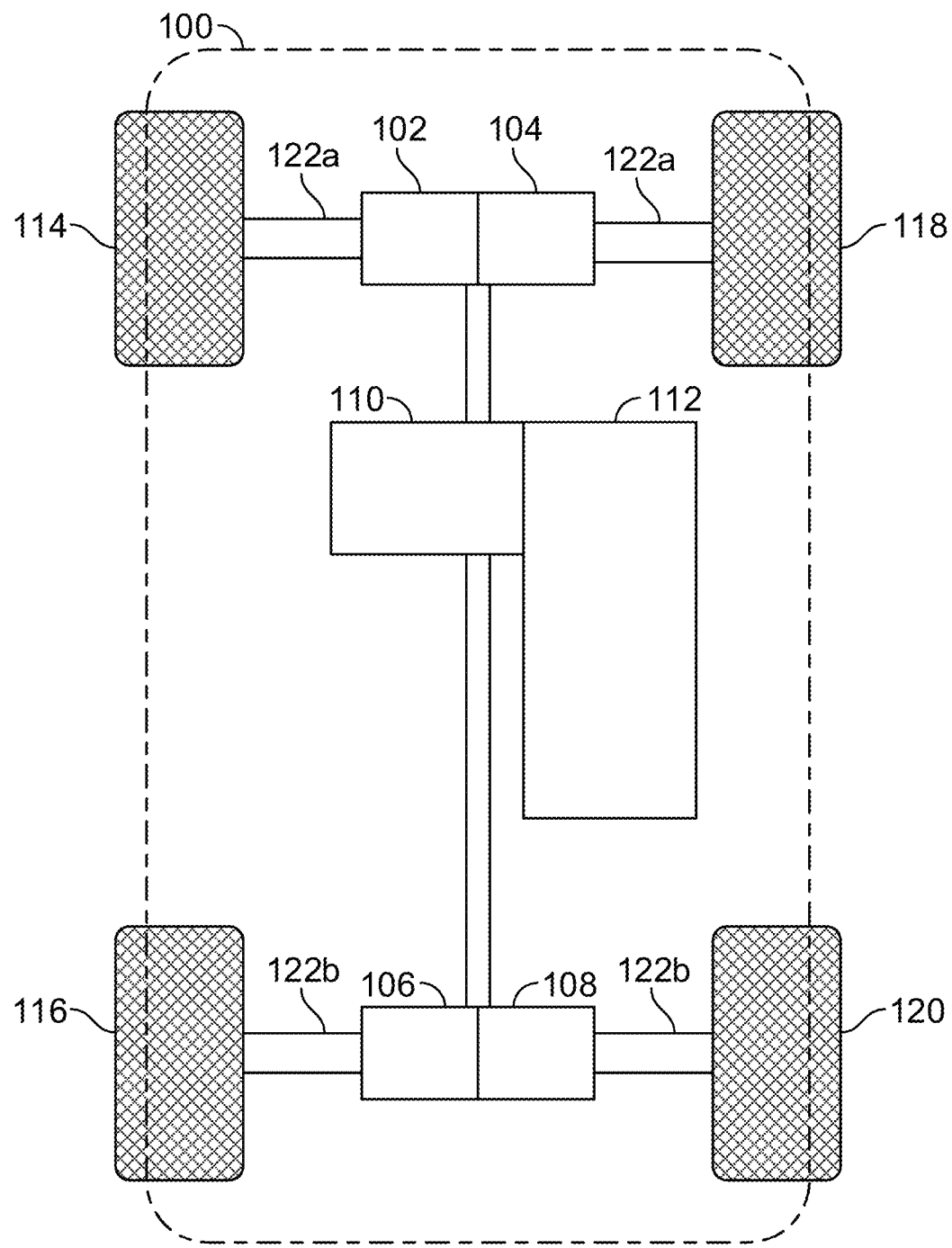
FIG. 1 shows an illustrative vehicle 100 having multiple motors, in accordance with some embodiments of the present disclosure.
Figure 2:
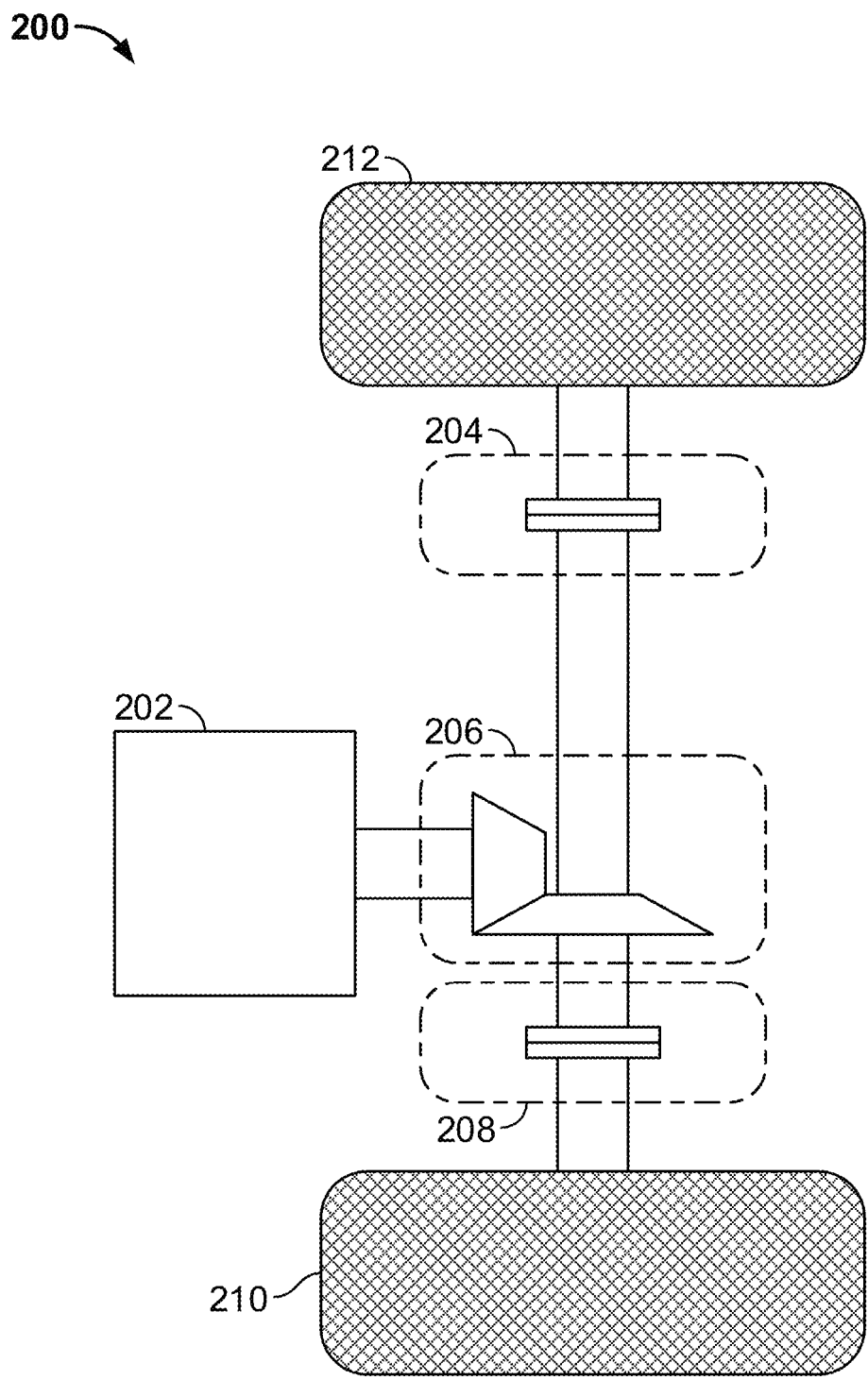
FIG. 2 shows an illustrative, engageable driveline, in accordance with some embodiments of the present disclosure.

FIG. 1 shows an illustrative vehicle 100 having multiple motors, in accordance with some embodiments of the present disclosure. FIG. 1 depicts an exemplary four-wheeled vehicle 100 having one motor coupled to each wheel. In some embodiments, the disconnect of the present disclosure may be implemented in a vehicle with any suitable number of motors and wheels. In some embodiments, there may be less than or more than one motor per wheel (e.g., one motor for the front two wheels and one motor for the rear two wheels), as depicted in FIG. 2. The level of torque applied by each of the one or more assemblies may be determined and generated based on the embodiments described herein. For example, motor assemblies 102, 106 may generate torque clockwise and motor assemblies 104, 108 may generate torque counterclockwise for vehicle 100 to move forward. More specifically, motor assemblies 102, 104, 106, and 108 may each include an electric motor, a gearbox (e.g., a reduction gearset or pully set), including a two-way controllable mechanical diode (CMD) clutch, a driveline coupling (e.g., to one of wheels 114, 116, 118, or 120, as illustrated), auxiliary components (e.g., a linear translator, a cooling system, a power electronics system, processing circuitry, vehicle dynamics module), any other suitable components, or any combination thereof. As illustrated in FIG. 1, each motor assembly 102, 104, 106, and 108 couples to control system 110 via communication lines 124, which may include power leads, control wires, sensor wires, communications buses, any other suitable coupling types, and any suitable components to provide torque to respective motor assemblies, or any combination thereof. Control system 110 is illustrated being coupled to a battery pack 112, although in some examples the control system 110 may incorporate one or more battery packs or otherwise be configured to provide electrical power (e.g., current) to electric motors of motor assemblies 102, 104, 106, and 108.

Control system 110 may be configured to generate torque commands for each of the motor assemblies 102, 104, 106, and 108 via driveline 122a, 122b, where the commands may indicate one or more levels of vehicle torque, and where each level of vehicle torque may indicate a level of torque for each of the motor assemblies 102, 104, 106, and 108. In some embodiments, control system 110 generates control signals for each of the motor assemblies 102, 104, 106, and 108. The torque generated by motor assemblies 102, 104, 106, and 108 are delivered to respective wheels 114, 118, 116, and 120 via drivelines 122a, 122b (e.g., half shafts). The control signals may include messages, current values, torque values, rotations per minute (RPM) values, speed delta magnitudes, synchronization status, pulse width modulation (PWM) values, any other suitable values, any other information indicative of a desired operation, or any combination thereof. For example, control system 110 may include a speed controller (e.g., a proportional-integral-derivative (PID) feedback controller), a torque controller, a current controller (e.g., per motor phase of each motor), a position controller, any other suitable controllers, or any combination thereof. Moreover, control system 110 may include adaptive cruise control, semi-autonomous control, or fully autonomous control capabilities such as described above with respect to the vehicle 100 and components thereof, e.g., the motor assemblies 102, 104, 106, and 108, driveline 122a, 122b, etc.

FIG. 2 shows an illustrative, engageable driveline, in accordance with some embodiments of the present disclosure. FIG. 2 depicts an exemplary driveline 200, which includes motor assembly 202 (e.g., corresponding to one of motor assemblies 102, 104, 106, and 108 of FIG. 1), gearbox 206, disconnects 204, 208, and wheels 210, 212. Although labeled separately, gearbox 206 and disconnects 204, 208 may be combined as a single assembly having any suitable components (e.g., clutches, gear reductions, pulleys, bearings, lubrication systems, shafts, joints, differential, brakes, controls) and any number of disconnects (e.g., one, two, or more than two). In some embodiments, for example, a vehicle may include front wheels and rear wheels, and may engage the front wheels, the rear wheels, or both, as needed. For example, wheels 210, 212 may be either front or rear wheels, and if increased torque is desired, a control system (e.g., control system 110) may determine to engage motor assembly 202 and activate disconnects 204, 208 via gearbox 206, which may include two-way controllable mechanical diode (CMD) clutches. Disconnects 204, 208 may each include a pocket plate and a notch plate, where the pocket plate includes struts that extend out and engage in the notches in the notch plate. Accordingly, the disconnect (e.g., the CMD clutches) are in a "locked" state, which, for example, allows the vehicle to enter all-wheel drive (AWD) as opposed to two-wheel drive. In some embodiments, instead of two disconnects 204, 208, a single disconnect can be used between motor assembly 202 and gearbox 206. In some embodiments the vehicle may already be moving, so the control system, including a speed controller, may accelerate motor assembly 202 before activating disconnects 204, 208 to prevent or otherwise lessen interaction torques (e.g., from a difference in speed of mating components). Contrarily, in some embodiments, the control system, including a speed controller, may decelerate motor assembly 202 before activating disconnects 204, 208 to prevent or otherwise lessen interaction torques. In some embodiments, as illustrated in FIG. 1, each wheel of the vehicle may correspond to a respective motor assembly, and each motor assembly may be engageable/dis-engageable with the respective wheel. Thus, one or several motor assemblies may be detached from a gearbox and/or interface when not being used for providing torque.

Figure 3:
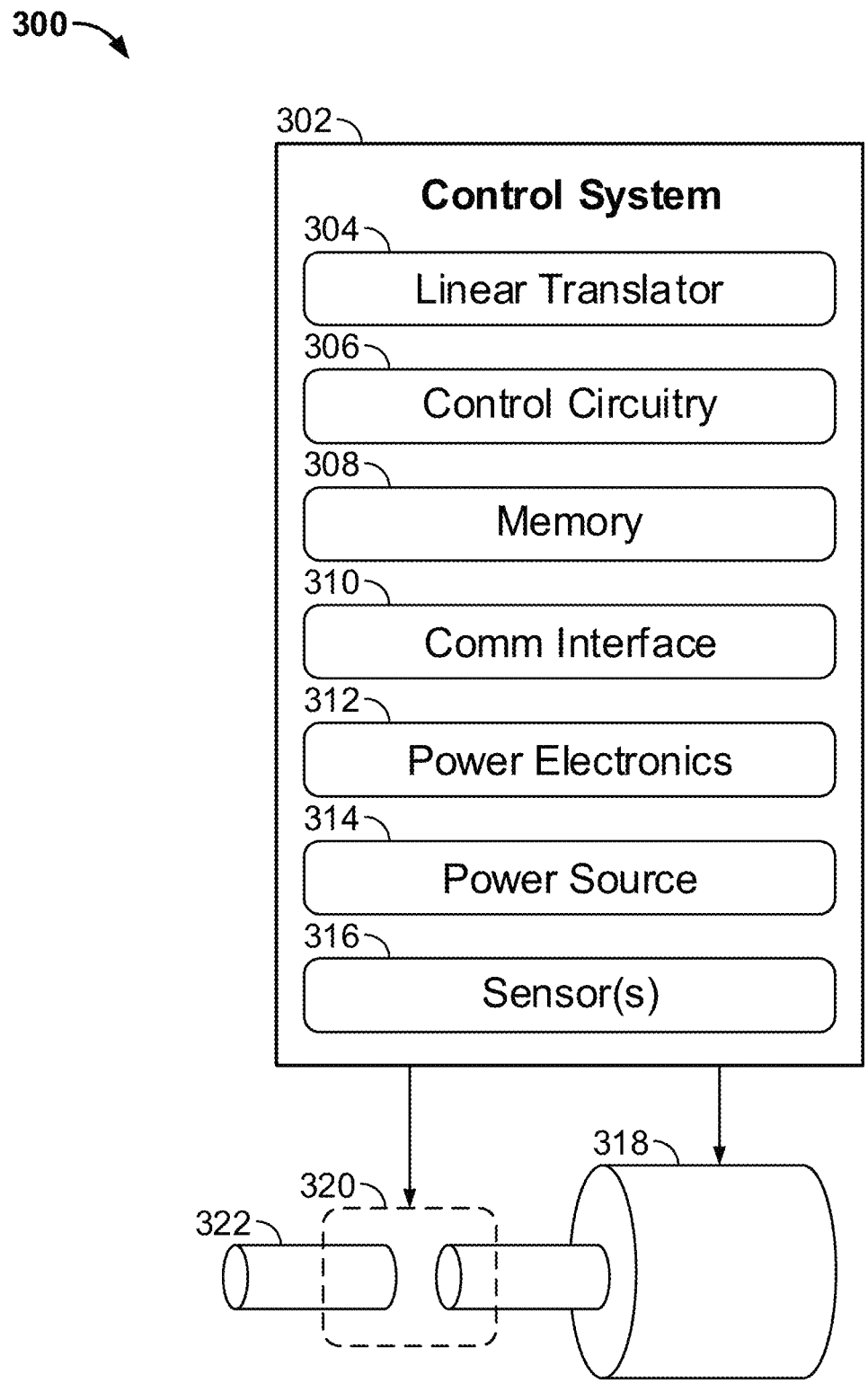
FIG. 3 shows an illustrative control system, motor assembly, disconnect, and load, in accordance with some embodiments of the present disclosure.

FIG. 3 shows an illustrative control system, motor assembly, disconnect, and load, in accordance with some embodiments of the present disclosure. As illustrated, system 300 includes control system 302 (e.g., corresponding to control system 110 of FIG. 1), motor assembly 318 (e.g., corresponding to motor assembly 202 of FIG. 2 and motor assembly 102, 104, 106, and 108 of FIG. 1), disconnect 320 (e.g., corresponding to disconnect 204, 208 of FIG. 2), and load 322. Control system 302 includes linear translator 304, processing circuitry 306, memory 308, communications (COMM) interface 310, power electronics 312, power source 314, and one or more sensors 316. In some embodiments, control system 302 may include any other suitable components, or a combination thereof. In some embodiments, control system 302 may be used to engage and disengage wheels, coupled to load 322, from motor assembly 318 via disconnect 320.

Control system 302 includes linear translator 304, which receives commands from processing circuitry 306, which may include a vehicle dynamics module, and actuates the two-way CMD clutches located in disconnect 320 to either engage or disengage. Control system 302 includes processing circuitry 306 configured for controlling operation of motor assembly 318. Processing circuitry 306 may include a processor such as, for example, the vehicle dynamics module, a central processing unit having a single core or dual core, bus, logic circuitry, integrated circuitry, digital signal processor, graphics processor, embedded processing device, any other suitable components for reading and executing computer instructions, or any combination thereof. In some embodiments, the vehicle dynamics module may be an electrical control unit. Memory 308 may include any suitable storage device such as, for example, volatile memory, non-volatile memory, a removable storage device, a solid state storage device, an optical device, a magnetic device, any other suitable component for storing and recalling information, or any combination thereof. COMM interface 310 may include electrical terminals, level shifters, a communications module, connectors, cables, antennas, any other suitable components for transmitting and receiving information, or any combination thereof. For example, COMM interface 310 may include an ethernet interface, a Wi-Fi interface, an optical interface, a sensor interface (e.g., for interacting with one or more sensors 316), any other suitable wired or wireless interface, or any combination thereof. In some embodiments, COMM interface 310 may include a sensor interface having a power supply, analog-to-digital converter, digital-to-digital converter, signal processing equipment, signal conditioning equipment, connectors, electrical terminals, any other suitable components for managing signals to and from a sensor, or any combination thereof. In further embodiments, a sensor interface may be configured to communicate with a current sensor, a position sensor (e.g., a rotary encoder coupled to the motor shaft or gear shaft), a temperature sensor, a voltage sensor, an accelerometer (e.g., a vibration sensor), any other suitable sensor of sensor(s) 316, or any combination thereof. In some embodiments, COMM interface 310 is configured to transmit a control signal indicative of a motor command to power electronics 312. Power electronics 312 may include a motor drive, switches (e.g., IGBTs, MOSFETs), diodes (e.g., flyback diodes), one or more buses (e.g., a DC bus), any other suitable components, arranged in any suitable configuration (e.g., an H-bridge, a half-bridge), or any combination thereof. Power source 314 may include a battery, a battery system (e.g., battery pack 112 of FIG. 1), leads coupled to a battery system, or a combination thereof, for providing electric power to processing circuitry 306, memory 308, COMM interface 310, power electronics 312, one or more sensors 316, motor assembly 318, disconnect 320, any other suitable components, or any combination thereof.

In some embodiments, control system 302 is configured to control engagement at disconnect 320. For example, disconnect 320 may include two-way CMD clutches controlled (e.g., engaged, disengaged) by control system 302. In a further example, disconnect 320 may include one or more actuators (e.g., electric motors, solenoids), mechanical actuators (e.g., a pocket plate, a notch plate), hydraulic actuators, pneumatic actuators, sensors (e.g., speed sensors, load sensors, vibration sensors, optical sensors, limit switches), any other suitable components for managing engagement of motor assembly 318 and load 322, or any combination thereof.

In some embodiments, control system 302 may be configured to control motor assembly 318. In some embodiments, motor assembly 318 includes phases, corresponding to windings, that are coupled via phase leads to power electronics 312. In further embodiments, power electronics 312 are configured to receive control signals from processing circuitry 306. Processing circuitry 306 may be configured to implement a motor control algorithm (e.g., an inertial model), based on computer instructions stored in memory 308, that generates the control signal based on one or more inputs (e.g., motor speed and wheel speed). For example, processing circuitry 306 may be configured to implement a control scheme for generating a current command based on a desired performance (e.g., a desired motor position, speed, acceleration, torque, flux, or a combination thereof), and may generate a control signal indicative of the current command. In some embodiments, the control signal may include a pulse-width modulated (PWM) signal, a pulse-density modulated (PDM) signal, an analog signal, a digital signal (e.g., via serial or parallel interface), any other suitable signal type, or any combination thereof.

In some embodiments, control system 302 (e.g., or processing circuitry 306 thereof) may be configured to execute a motor control algorithm (e.g., an inertial model) for engaging and disengaging, via disconnect 320, motor assembly 318 from load 322. In some embodiments, linear translator 304 is responsive to the motor control algorithm (e.g., inertial model) from control system 302 and actuates the engagement or disengagement of disconnect 320. For example, system 300 may be included in an electric vehicle, wherein load 322 corresponds to a driveline or a portion thereof. When more torque is needed to propel the vehicle, motor assembly 318 (e.g., which initially may be disconnected from load 322) may be attached to load 322 (e.g., the output shaft or driveline coupled to a gearbox) via disconnect 320. During the engagement of motor assembly 318 and load 322, large interactive torques may arise that may reduce the lifetime of components (e.g., motor assembly 318, the gearbox of load 322, or a clutch of disconnect 320), damage components, or a combination thereof. In some embodiments, control system 302 (e.g., or processing circuitry 306 thereof) may be configured to achieve a softer engagement between motor assembly 318 and load 322, exhibit a fast acceleration rate, or both. In some embodiments, the present disclosure is directed to a motor controller (e.g., a speed controller) configured to achieve a relatively small or reduced interactive torque during the engagement or disengagement of disconnect 320.

Figure 4B:
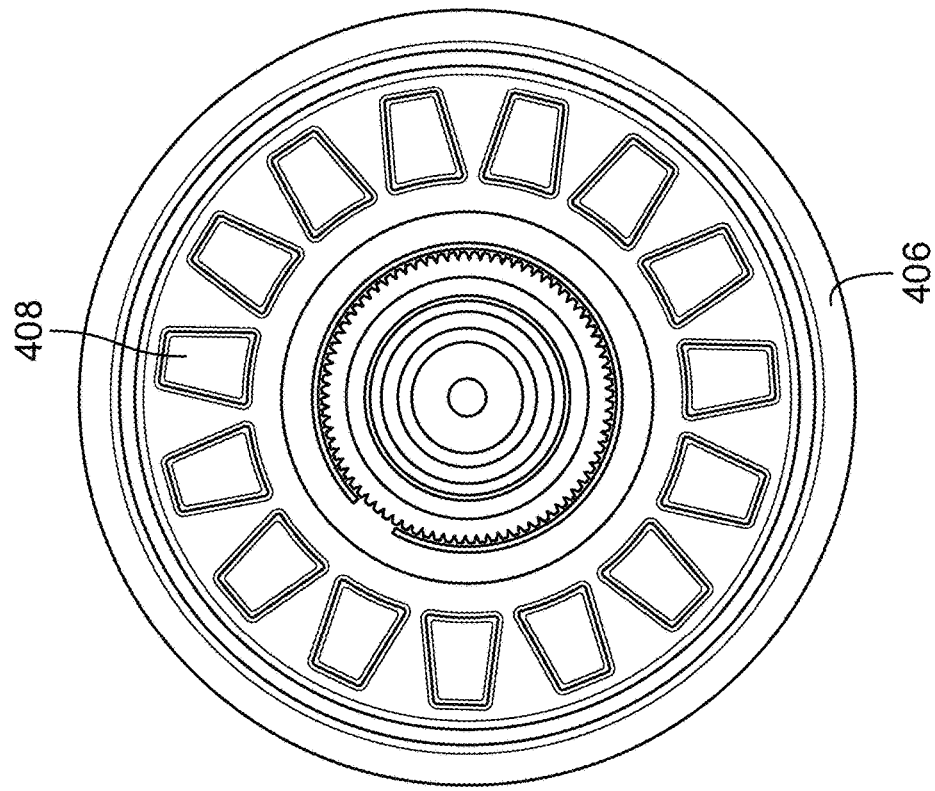
FIG. 4B shows an illustrative notch plate 406, in accordance with some embodiments of the present disclosure.
Figure 4A:
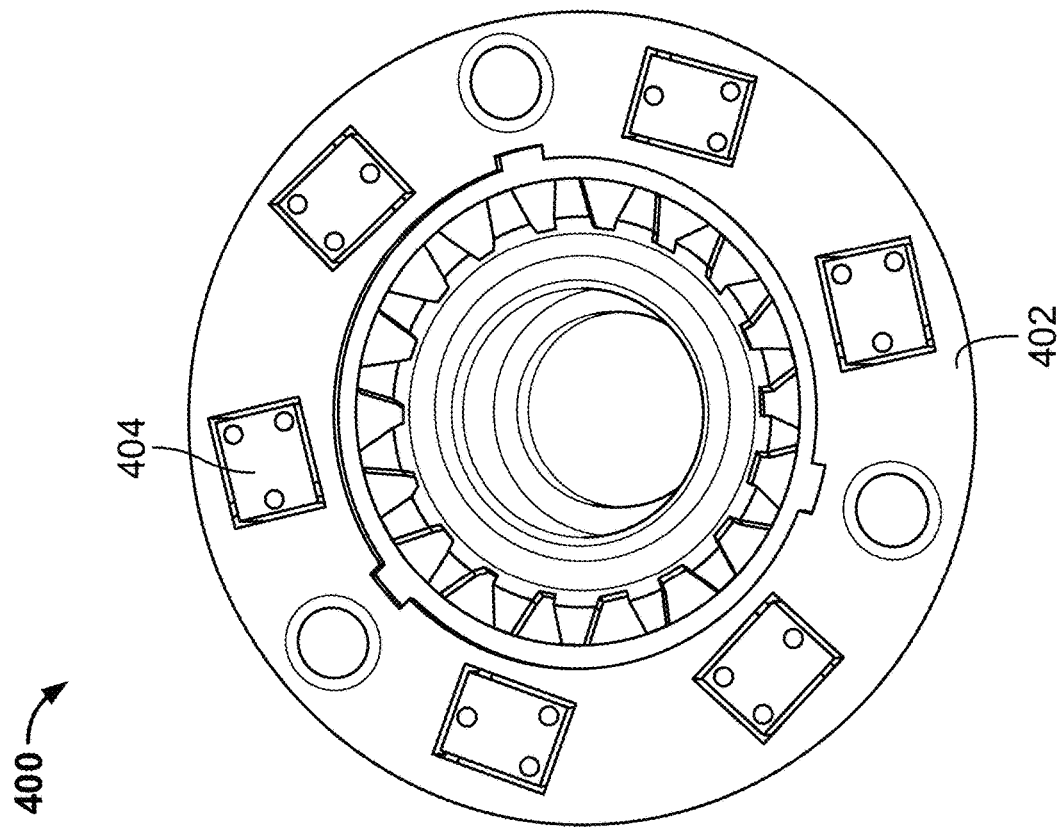
FIG. 4A shows an illustrative pocket plate 402, in accordance with some embodiments of the present disclosure.

FIG. 4A shows an illustrative pocket plate 402, in accordance with some embodiments of the present disclosure, and FIG. 4B shows an illustrative notch plate 406, in accordance with some embodiments of the present disclosure. Pocket plate 402 includes at least one strut 404, and notch plate 406 includes at least one notch 408. It will be understood that pocket plate 402 may include any suitable number of struts 404 and notch plate 406 may include any suitable number of notches 408. In some embodiments, the components of FIG. 4A and FIG. 4B may be implemented in any suitable vehicle type and may be altered to any suitable configuration, including modifications to any of the above features such as varied locations of struts, varied locations of notches, and additional couplings to processing circuitry. Pocket plate 402 and notch plate 406 may be used in any of the disconnects of the present disclosure (e.g., disconnects 204, 208, and 320).

The present disclosure may be implemented using any type of disconnect. In some embodiments, the present disclosure is implemented using two-way controllable mechanical diode (CMD) clutches. The CMD clutches, located in the disconnect, are actuated by a linear translator that may be directly controlled by the control system, including the vehicle dynamics module, of a vehicle. As illustrated in FIG. 4A and FIG. 4B, to mechanically couple the clutch plates, the struts 404 of the pocket plate 402 must extend out and engage in the notches 408 of the notch plate 406. In some embodiments, while in the "unlocked" state, the speed of the pocket plate 402, corresponding to the speed of the half-shaft and wheel, may differ greatly from the speed of the notch plate 406, corresponding to the speed of the motor and gearbox assembly. It will be understood that, in some embodiments, the pocket plate 402 may instead be coupled to the motor and gearbox assembly (e.g., inboard components) and the notch plate 406 may be coupled to the half-shaft and wheel (e.g., outboard components). To lock the pocket plate 402 with the notch plate 406, their respective speeds should be close to each other (e.g., synchronized within 20 RPM of each other). The specific synchronization threshold for a disconnect may depend on the type of disconnect and the specifications of the disconnect. For example, the control system, including a speed controller, may be calibrated to match the respective clutch speeds of the pocket plate 402 and the notch plate 406 to within 15 RPM in less than 225 milliseconds from when the speed controller receives the command from processing circuitry to engage the disconnects. It will be understood that the control system may be calibrated to synchronize the respective speeds of the clutch plates to within any suitable synchronization threshold in less than any suitable time period. To enable dynamic actuation of the devices, a robust algorithm (e.g., an inertial model) may be utilized to synchronize the motor assembly and wheel speeds in the "unlocked" state. In some embodiments, the disconnect devices do not contain any sensors for direct clutch state feedback. Therefore, in order to monitor the clutch states (e.g., locked or unlocked) and ensure safe delivery of torque through the rear driveline, sensorless diagnostic techniques are used to determine the state of the disconnect devices based on other available feedback signals (e.g., motor assembly speed in RPM, wheel speed in RPM, or torque pulses in Nm to determine the presence of a load).

Figure 5:
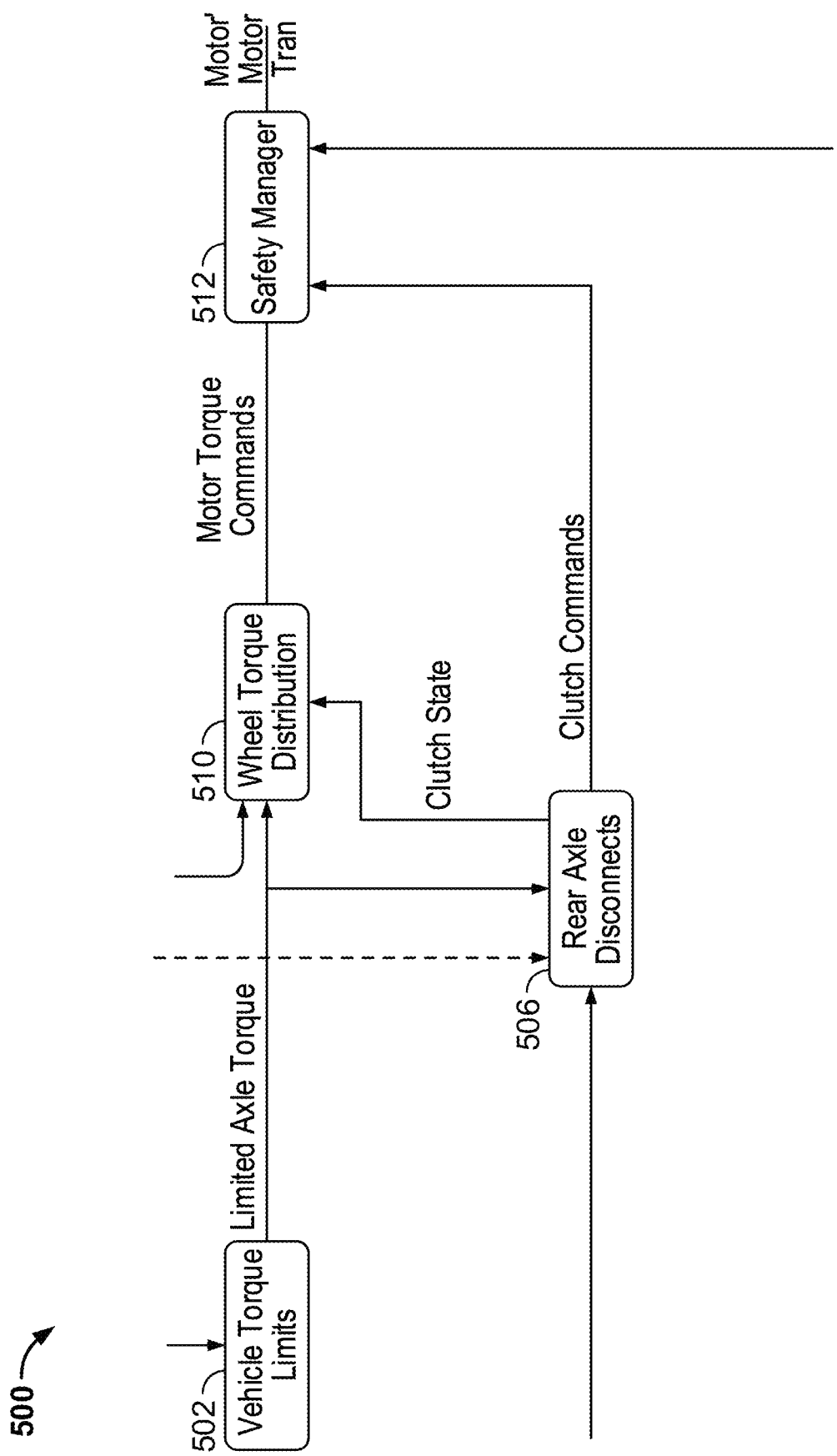
FIG. 5 shows an illustrative implementation of an axle disconnect controller in a vehicle dynamics module, in accordance with some embodiments of the present disclosure.

FIG. 5 shows an illustrative implementation of an axle disconnect controller in a vehicle dynamics module, in accordance with some embodiments of the present disclosure. As illustrated, vehicle dynamics module 500 includes vehicle torque limit 502, rear-axle disconnect 506, wheel torque distribution 510, and safety manager 512. In some embodiments, vehicle dynamics module 500 may include any other suitable components, or a combination thereof. In some embodiments, vehicle dynamics module 500 may receive feedback signals (e.g., motor assembly speed in RPM, wheel speed in RPM, and/or torque response pulses in Nm to determine the presence of a load). In some embodiments, vehicle dynamics module 500 may be a part of processing circuitry and be used to determine the state (e.g., locked or unlocked) of one or more disconnect devices based on the received feedback signals.

A vehicle (e.g., vehicle 100) may implement the axle disconnect controller (e.g., rear-axle disconnect controller 506) for implementing the functionality of the present disclosure. In some embodiments, the axle disconnect controller may be implemented by the vehicle dynamics module 500 that also implements other controllers. Vehicle dynamics module 500 includes the axle disconnect controller as a rear-axle disconnect controller 506 that includes functionality to control the two linear translators that lock and unlock two rear disconnect devices (e.g., two-way CMD clutches), one for each motor assembly and wheel. As explained above, locking of the disconnect devices are to occur when the clutch plate speeds are sufficiently synchronized (e.g., the respective speeds of the pocket plate and the notch plate are within 20 RPM of each other). Accordingly, the axle disconnect controller is configured to calculate the target synchronization speed and control the drive unit speeds, via a speed controller, to achieve sufficient synchronization, where the drive unit includes the respective driveline, motor assembly, gearbox, and notch or pocket plate (e.g., inboard components) of the vehicle. It will be understood that the drive unit may include any suitable vehicle component, or any combination thereof. In some embodiments, the locking process of two rear disconnect devices uses vehicle dynamics module 500 to perform closed-loop speed control on both rear drive units. To enable this functionality, wheel torque distribution controller 510 receives torque commands for speed control from an interface with, for example, the axle disconnect controller. Wheel torque distribution controller 510 also receives a limited axle torque signal from vehicle torque limits 502 and delivers motor torque commands to safety manager 512. In some embodiments, the rear axle disconnect controller 506 may disable any alteration of the vehicle dynamics torque command by a downstream controller (e.g., by the driveline/lash controller) to ensure that the speed controller and engagement state detection functions have full control over the unloaded motor assembly's kinetic energy.

In some embodiments, sub-functions (e.g., speed estimation, H-bridge control, speed control, engagement state detection) may be used for implementing a disconnect controller, in accordance with the present disclosure.

Figure 6:
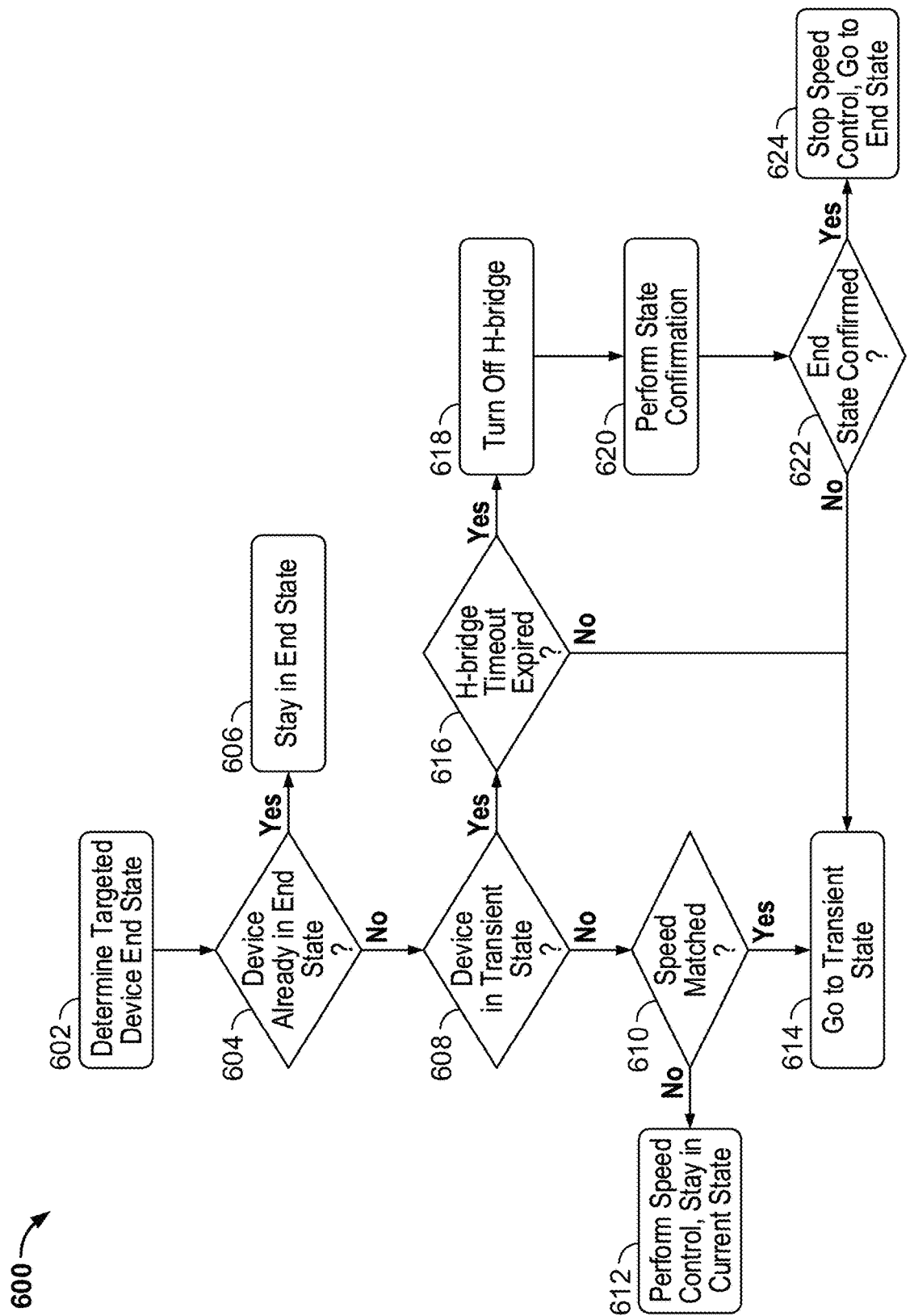
FIG. 6 shows a flowchart of illustrative steps for governing the disconnect actuation, in accordance with some embodiments of the present disclosure.

FIG. 6 shows a flowchart of illustrative steps for governing the disconnect actuation, in accordance with some embodiments of the present disclosure. The process 600 may be executed by processing circuitry (e.g., the vehicle dynamics module) located in control system 110 of vehicle 100. In some embodiments, linear translator 304 may receive commands from the processing circuitry and initiate the disconnect between the pocket plate and the notch plate (e.g., the two-way CMD clutches). It will be understood that process 600, and any step thereof, may be altered to any suitable configuration, including modifications to any of the steps themselves.

The process 600 begins at step 602, where the control system determines the targeted device end state. The "end state" refers to the final device state (e.g., locked or unlocked), which corresponds to each of the two possible values of a binary target-state flag. For example, as depicted below by Table 1, the "locked" end state for the disconnect device may correspond to the binary target-state "1" and cause the control system to actuate "Forward drive, Device disable" as the subsequent command. Contrarily, the "unlocked" end state for the disconnect device may correspond to the binary target-state "0" and cause the control system to actuate "Backward drive, Device disable" as the subsequent command.

| Target state flag | Transient state | End state |
| --- | --- | --- |
| Locked (1) | Locking: Forward drive, Device enable | Locked: Forward drive, Device disable |
| Unlocked (0) | Unlocking: Backward drive, Device enable | Unlocked: Backward drive, Device disable |

If the control system determines the disconnect device is already in the end state, step 604, the disconnect device remains in the end state, step 606, wherein the speed controller of the control system switches to an inactive state, but the control system may continue monitoring the speed delta threshold between the two-way CMD clutches. If the control system determines the disconnect device no longer remains in the end state, step 604, the control system determines whether the disconnect device is in the transient state, step 608. If the control system determines the disconnect device is not in the transient state, the control system determines whether the respective speeds of the two-way CMD clutches has been matched, step 610. If the control system determines the respective speeds of the two-way CMD clutches has not been matched, the control system actuates the speed controller to match the clutch speeds of the pocket plate and notch plate to within the speed delta threshold (e.g., within 20 RPM of each other). In some embodiments, a robust algorithm (e.g., an inertial model) may be used to synchronize the motor assembly and wheel speeds in the "unlocked" state. If the control system determines the respective speeds of the two-way CMD clutches has been matched, the control system determines the disconnect device is in the transient state, which includes speed synchronization of the two-way CMD clutches, disconnect device actuation while continued speed-matching, and confirmation of the engagement of the disconnect device. The "transient state" refers to the intermediate state (e.g., locking or unlocking), which corresponds to each of the two possible values of the binary target-state flag. For example, as depicted above by Table 1, the "locking" transient state for the disconnect device may correspond to the binary target-state "1" and cause the control system to actuate "Forward drive, Device enable" as the subsequent command. Contrarily, the "unlocking" transient state for the disconnect device may correspond to the binary target-state "0" and cause the control system to actuate "Backward drive, Device enable" as the subsequent command.

If the control system determines the disconnect device is in the transient state, step 608, the control system determines whether the H-bridge timeout has expired, step 616. If the H-bridge timeout has not expired, the control system determines the disconnect device is in the transient state, step 614. If the H-bridge timeout has expired, the control system turns off the H-bridge, step 618, wherein the H-bridge controls the bi-directional motion of the coupled linear actuator. Accordingly, the control system performs state confirmation, step 620, which, in some embodiments, may be the control system injecting torque commands to detect the presence of a load on the gearbox output shaft (e.g., driveline) based on motor speed response. At step 622, the control system determines whether the end state of the disconnect device is confirmed. If the end state is not confirmed, the control system determines the disconnect device is in the transient state, step 614. If the end state is confirmed, the control system stops speed control and actuates the end state of the disconnect device, step 624.

Figure 7:
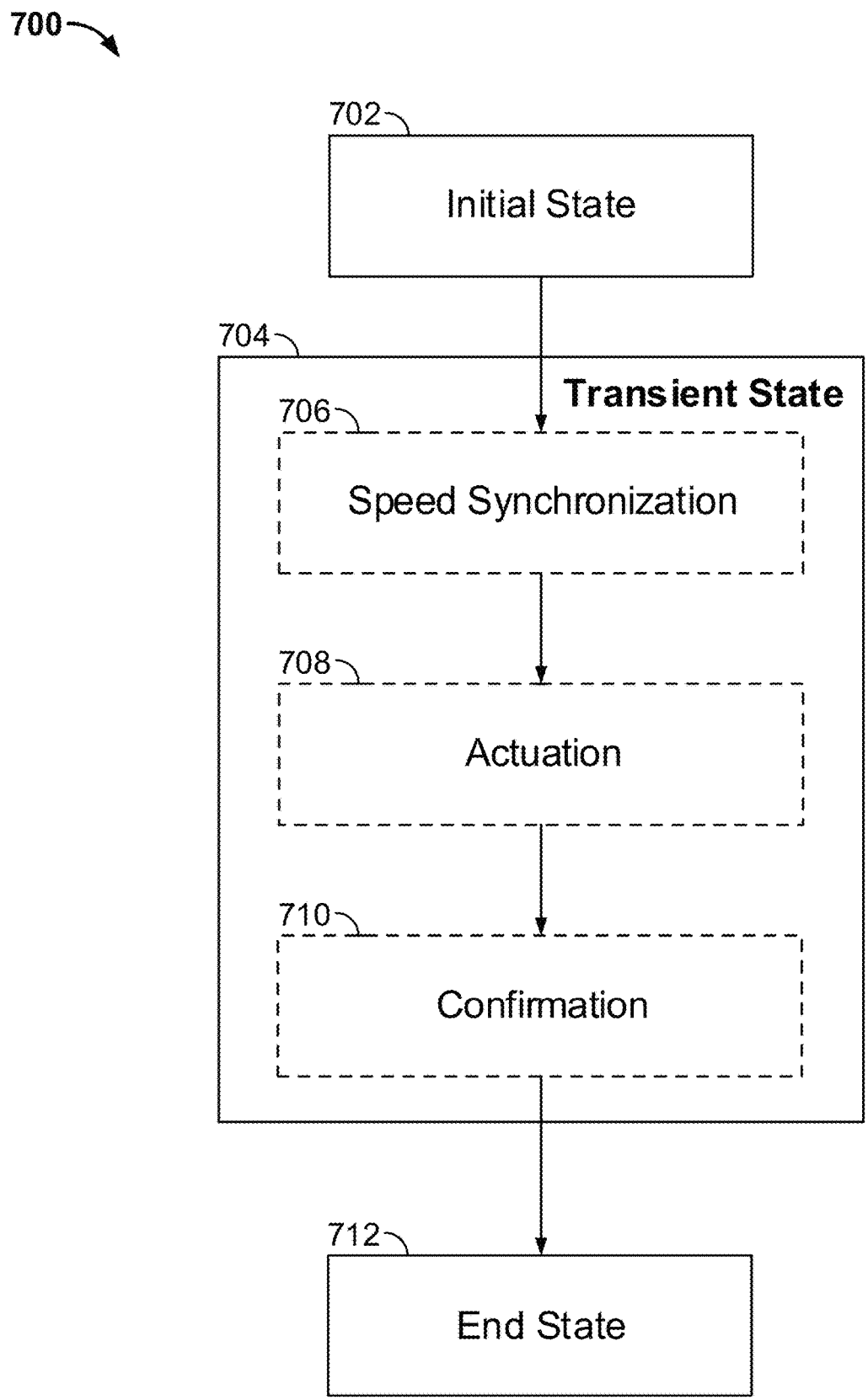
FIG. 7 shows a flowchart of illustrative steps for actuating the transient state of the disconnect device, in accordance with some embodiments of the present disclosure.

FIG. 7 shows a flowchart of illustrative steps for actuating the transient state of the disconnect device, in accordance with some embodiments of the present disclosure. The process 700 may be executed by processing circuitry (e.g., vehicle dynamics module 500) located in control system 110 of vehicle 100. In some embodiments, linear translator 304 may receive commands from the processing circuitry and initiate the disconnect between the pocket plate and notch plate (e.g., the two-way CMD clutches). It will be understood that process 700, and any step thereof, may be altered to any suitable configuration, including modifications to any of the steps themselves.

The process 700 begins at step 702, where control system 110 determines the initial state of the disconnect device is unlocked. Accordingly, control system 110, via the speed controller, initiates the transient state 704 by actuating speed synchronization 706 of pocket plate 402 and notch plate 406, which includes reducing a rear propulsive torque limit to zero and matching the speed of the motor assembly with the speed of the wheel to within a speed delta threshold (e.g., 15 RPM). In some embodiments, a closed-loop motor speed controller on vehicle dynamics module 500 will match the speeds of the outboard and inboard clutches. The speed delta between the clutches prior to locking may be within a predetermined RPM amount (e.g., 20 RPM or less at 252 RPM in the motor domain). Each wheel speed reference may be calculated, for example, by differentiating the output from a high-resolution encoder received over a controller area network (CAN) bus. In some embodiments, different settings of the speed controller may be used based on the speed of the vehicle or the target motor speed to quickly reach the target speed with minimal or no overshoot. Once control system 110 determines the respective speeds of the two-way CMD clutches have been synchronized, control system 110 initiates the actuation 708 of the disconnect device by enabling the H-bridge, which controls the bi-directional motion of the coupled linear actuator, to actuate disconnects toward a desired position (e.g., the struts of pocket plate 402 engaging with the notches of notch plate 406). Concurrently, the disconnect device continues to match the speeds of the outboard and inboard clutches. Once control system 110 determines the H-bridge timeout has expired, control system 110 initiates the confirmation 710 of the disconnect device, which includes disabling the H-bridge, introducing a speed delta (e.g., a speed offset) for the speed controller of control system 110 to incorporate, and integrating torque commands, via the speed controller, to monitor speed-matching results between the motor assembly and the load on the gearbox output shaft (e.g., the driveline). Once control system 110 determines the disconnect device is locked, control system 110 actuates the end state 712, which includes inactivating the speed controller. In some embodiments, control system 110 may continue monitoring the speed delta between the outboard and inboard clutches.

Figure 8:
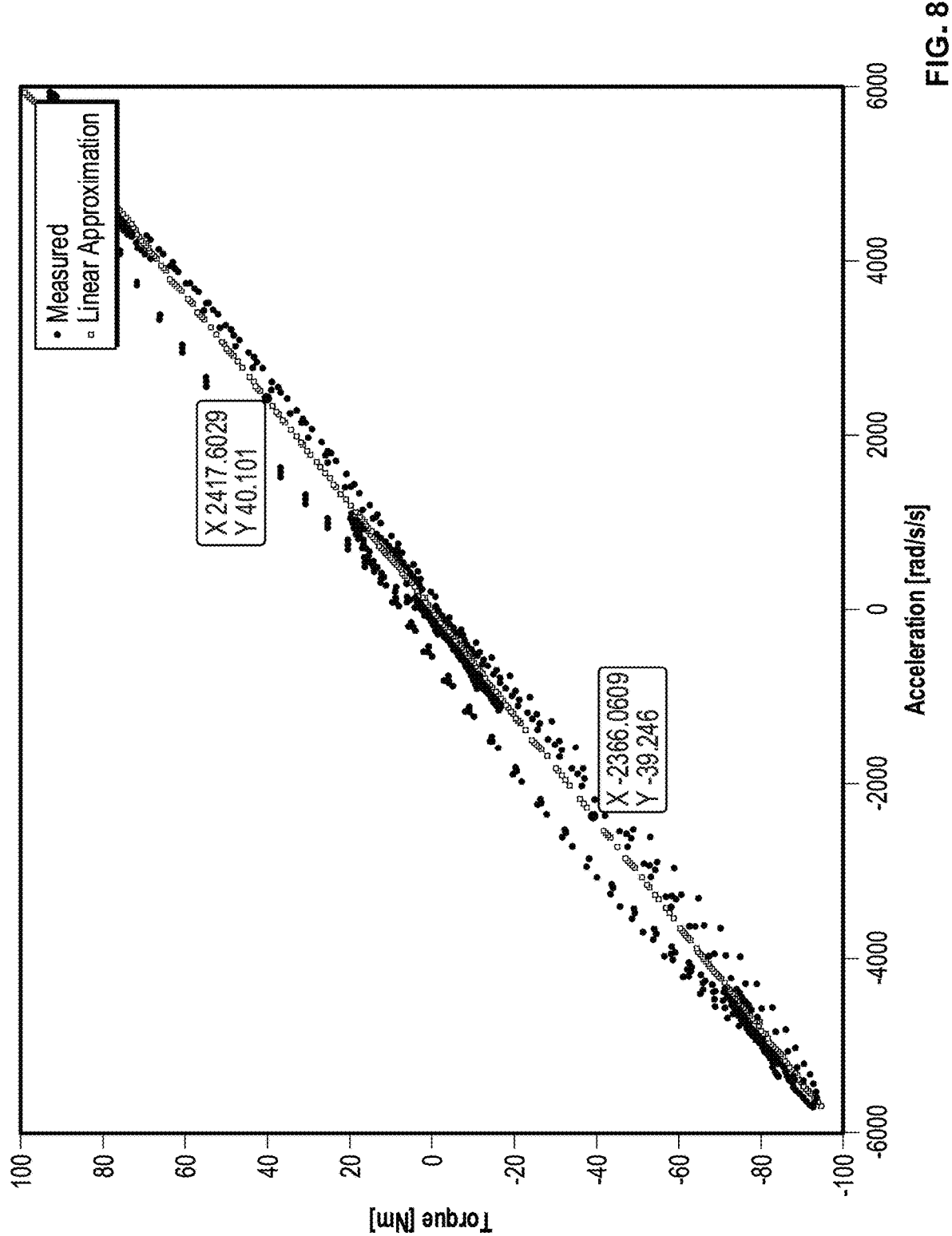
FIG. 8 shows an example diagram depicting electric motor acceleration versus torque applied, in accordance with some embodiments of the present disclosure.

FIG. 8 shows an example diagram depicting electric motor acceleration versus torque applied, in accordance with some embodiments of the present disclosure. The slope of the acceleration-versus-torque curve, which is roughly 0.017 kg*m², corresponds to the effective inertia of the motor assembly and any connected components (e.g., gearbox, inboard disconnect clutch) when the disconnect is in the "unlocked" state. With knowledge of the effective inertia of the unloaded inboard components, a purely proportional motor speed regulator may be developed and tuned, assuming, based on FIG. 8, there are no significant static offsets or phase delays (e.g., due to viscous drag).

$$\epsilon = \omega_{ref} - \omega_{motor}$$

$$\dot{\omega}_{motor} = K\epsilon$$

$$T = J\dot{\omega}_{motor} = JK(\omega_{ref} - \omega_{motor})$$

where:
K=controller gain
J=effective inertia of inboard components
T=torque request (controller output)
A controller gain of 10 would roughly correspond to a 100-millisecond time constant, which may be well within the stability constraints imposed by a 100 Hz task rate (e.g., 10 millisecond sampling interval). In some embodiments, the torque command from the speed controller will be limited to, for example, +/−40 Nm, which—as shown by the data tips in FIG. 8—corresponds to a motor speed slew rate of roughly 2,400 rad/s² (e.g., 23,000 RPM/s).

To confirm that the speed delta between the inboard and outboard clutches has settled to within an acceptable range, the filtered speed error signal over a statistically significant time window may be examined. In some embodiments, the error must be within a calibratable threshold in order to pass the check. In some embodiments, a debouncing strategy will be implemented using two thresholds:

Diagnostic Threshold—Represents the maximum allowable steady-state error. Momentary excursions outside this threshold will be debounced.

Best Possible Unacceptable (BPU) threshold—Represents the maximum instantaneous error. Any momentary excursion outside this threshold will instantly fail the diagnostic.

For speed-matching with unlocked disconnects, the diagnostic threshold, based on observed controller performance, may be 20 RPM in the wheel domain (e.g., 26 rad/s in the motor domain). The BPU threshold may be 40 RPM in the wheel domain (e.g., 52 rad/s in the motor domain). This threshold may be picked to be within an acceptable limit specified for the particular disconnect being used. Accordingly, a difference between the motor and wheel speeds greater than the BPU threshold will instantly cause this test to fail. Errors between 0-40 RPM will use debouncing logic. For example, a debouncing counter may be incremented while the error is between 0-20 RPM and decremented while the error is between 20-40 RPM. If the debouncing counter increases past a threshold within a predetermined amount of time or samples, then the test will pass. It will be understood that the thresholds used herein are merely illustrative and any suitable thresholds may be used as appropriate to determine if the speeds are matched. It will also be understood that these tests may be repeatedly applied (e.g., up to a predetermined amount of time such as 0.5 seconds or 1.0 second) until they are passed.

In some embodiments, asymmetrical debouncing logic may be used to shorten the duration of the speed synchronization phase of the disconnect actuation. For example, the debouncing counter may be incremented by more than 1 for each sample or time the speed error is below the diagnostic threshold. However, asymmetrical debouncing logic may depend on the stability of the speed controller. For example, if the speed controller overshoots the speed target, then the asymmetrical debouncing logic, which is used to shorten the time needed to determine if speeds are matched, may incorrectly determine that the speeds are matched before the motor speed has settled. In some embodiments, the speed matching logic may be prone to a false failure due to driveline dynamics as well as wheel speed measurement errors during vehicle launches (e.g., from rest). This may be exacerbated when a wheel is on a low friction surface. Accordingly, vehicle stability control and vehicle dynamics information may be used to modify the logic (e.g., to modify the thresholds to make them more lenient) to account for these vehicle conditions and reduce false failures.

In some embodiments, the following signals are available to the vehicle dynamics module and may be used to estimate the state of the disconnect device: motor assembly speed (e.g., from a controller area network (CAN bus)), wheel speed, speed controller torque command, and motor torque feedback. In some embodiments, the disconnect may be determined to be locked if the signals satisfy the following conditions:

Condition 1: Motor speed and wheel speed are well-correlated over a statistically significant number of samples.

Condition 2: Motor speed response to torque commands indicate the presence of a load on the gearbox output shaft (full driveline and vehicle inertia).

In some embodiments, Condition 1 is similar to the speed synchronization check described above. In some embodiments, Condition 1 being satisfied is necessary, but not sufficient, to confirm the "Locked" state. Accordingly, Condition 1 may be supplemented with Condition 2. Contrarily, failure of Condition 1 is sufficient to instantly confirm the "Unlocked" state. In the absence of a load on the gearbox output, the motor response to torque commands will follow the inboard-inertia model derived above. Conversely, if a load is present, the motor speed response will be affected by the driveline dynamics and the effective inertia of the vehicle. Therefore, it may be inferred whether the gearbox output shaft is loaded by comparing the measured motor speed response to the predicted response of an unloaded motor. In some embodiments, the clutches are determined to be locked if either of the following conditions are satisfied:

Condition 1: Unloaded speed response prediction deviates from the measured motor assembly speed by a significant margin.

Condition 2: Driveline dynamics are observed in inertial model and deviate from measured motor speed.

Condition 2 may be checked by applying a high pass filter or a band-pass filter to the model deviation from the speed measurement. The resulting signal would isolate the frequency content resulting from driveline resonances.

To confirm that the disconnects are unlocked, each rear motor assembly may be accelerated independently of its corresponding wheel. If the motor and wheel speeds deviate significantly in response to a torque command (e.g., a torque pulse delivered by the control system), then the outboard and inboard clutches must be decoupled (e.g., in an "Unlocked" state).

When locking the disconnects, the unloaded inertial model will deviate from the measured motor speed when driveline dynamics are present in the system (e.g., the half shaft torque is non-zero), which may occur when the disconnect clutches are fully locked (e.g., the struts are fully engaged with the notches) and there is consistent positive contact in the gearbox (i.e., any mechanical lash or clearance between gearbox components has been cleared). To trigger both conditions as quickly as possible, a speed differential may be introduced between the clutches that will allow the system to clear the "combined" (e.g., disconnect plus gearbox) lash zone. The speed differential may be introduced, for example, in two ways: closed-loop speed control or open-loop constant torque pulse (e.g., linearly ramping up speed). With locked disconnects, either method will result in a fast (e.g., high frequency) deviation between the unloaded inertial model and the measured motor speed after the inboard assembly (e.g., motor, gearbox, inboard clutch) accelerates through the effective lash zone, as depicted in FIG. 10 (e.g., constant torque pulse method).

Figure 9:
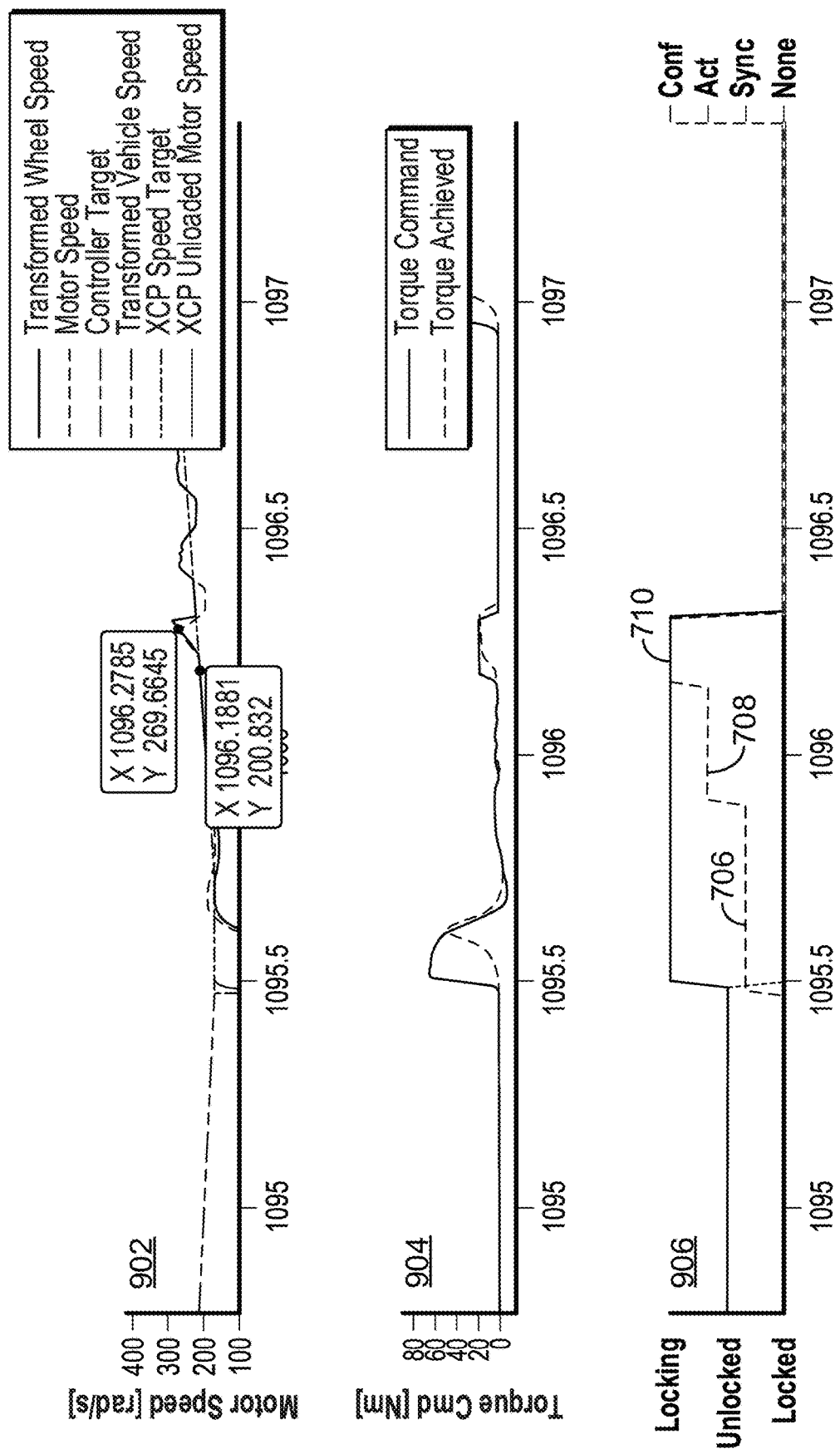
FIG. 9 shows an example diagram depicting a locking scenario, in accordance with some embodiments of the present disclosure.

FIG. 9 shows an example diagram depicting a locking scenario, in accordance with some embodiments of the present disclosure. As described above, to confirm the disconnects are locked, each rear motor assembly may be accelerated independently of its corresponding wheel by a torque pulse. If the motor and wheel speeds are significantly similar in response to the torque command (e.g., the torque pulse delivered by the control system), the control system determines that the outboard and inboard clutches are coupled (e.g., in a "Locked" state). Plot 906 shows the disconnect states before, during, and after the locking scenario and the different stages (e.g., speed synchronization 706, actuation 708, and confirmation 710) of locking. Plot 904 shows a torque command, delivered by the control system at the beginning of speed synchronization stage 706, to engage the two-way CMD clutches (e.g., pocket plate 402 and notch plate 406). Plot 902 shows two pairs of X,Y coordinates, which reflect points before and after the control system generates a second torque impulse to confirm the motor assembly speed matches the wheel speed. This second torque impulse appears in plot 904, which aligns with the confirmation stage 710 in plot 906.

Figure 10:
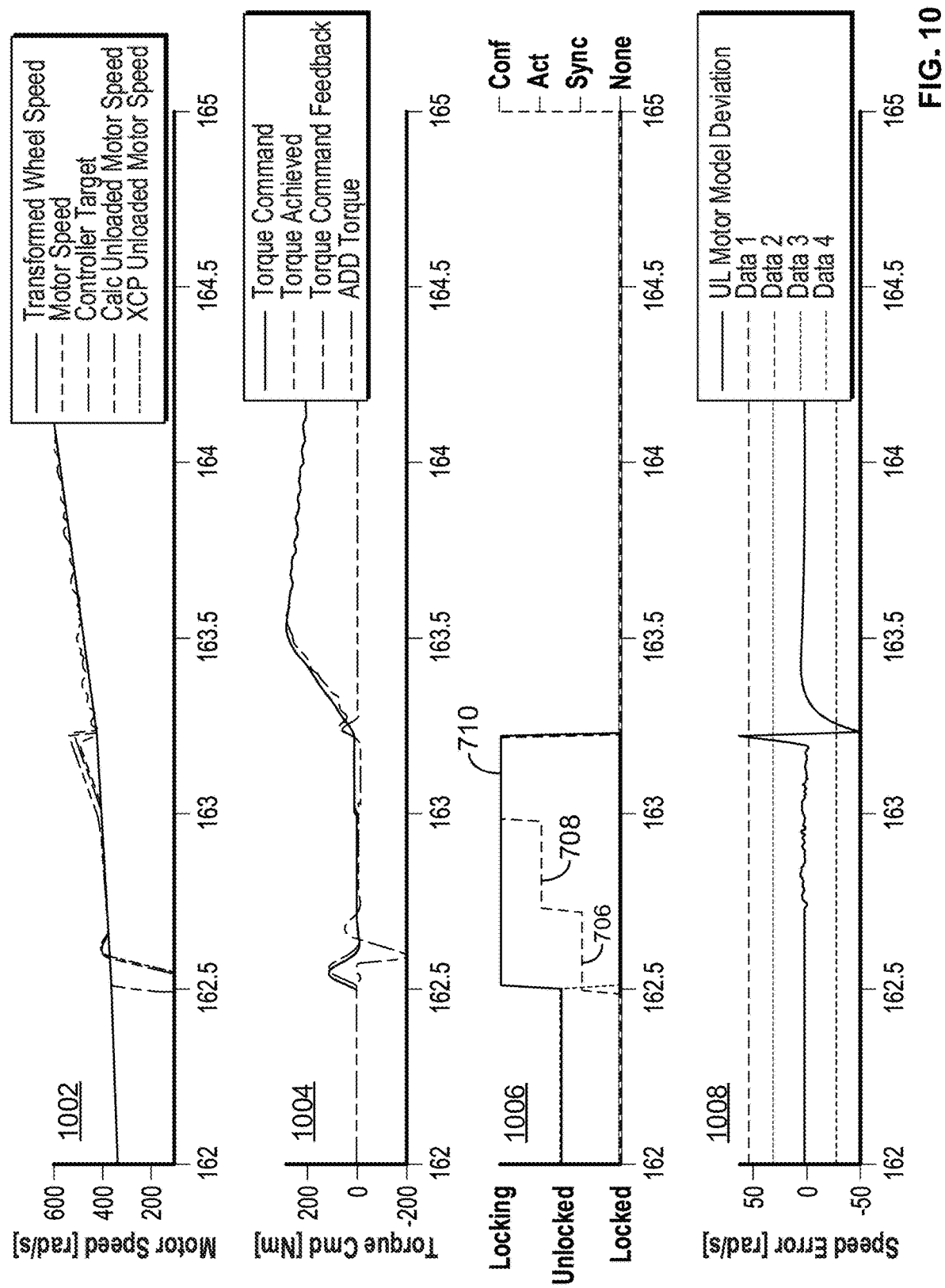
FIG. 10 shows a refinement of the locking scenario and state-detection technique displayed in FIG. 9, in accordance with some embodiments of the present disclosure.

FIG. 10 shows a refinement of the locking scenario and state-detection technique displayed in FIG. 9, in accordance with some embodiments of the present disclosure. Plot 1002 shows that the unloaded inertial model prediction slowly drifts away from the measurement due to inaccuracies in the model parameters. Plot 1008 shows the speed error, where the model deviation is high pass filtered with a corner frequency of 2 Hz during the actuate and confirm phases. The high pass filter removes the drift, making the diagnostic more effective. Note that, to make the calculation robust to any dynamics introduced by downstream control algorithms (e.g., driveline controllers), the unloaded speed response may be predicted using the measured motor torque (calculated using, for example, motor current), instead of the torque command from the disconnect controller. Plot 1006 shows the disconnect states before, during, and after the locking scenario and the different stages (e.g., speed synchronization 706, actuation 708, and confirmation 710) of locking. Plot 1004 shows the torque produced by the rear drive unit, which is used to accelerate the motor and gearbox assembly to achieve speed synchronization between the CMD clutch plates. Once the "Locked" state is confirmed, the torque is smoothly ramped up to accelerate the vehicle in four-wheel drive.

Figure 11:
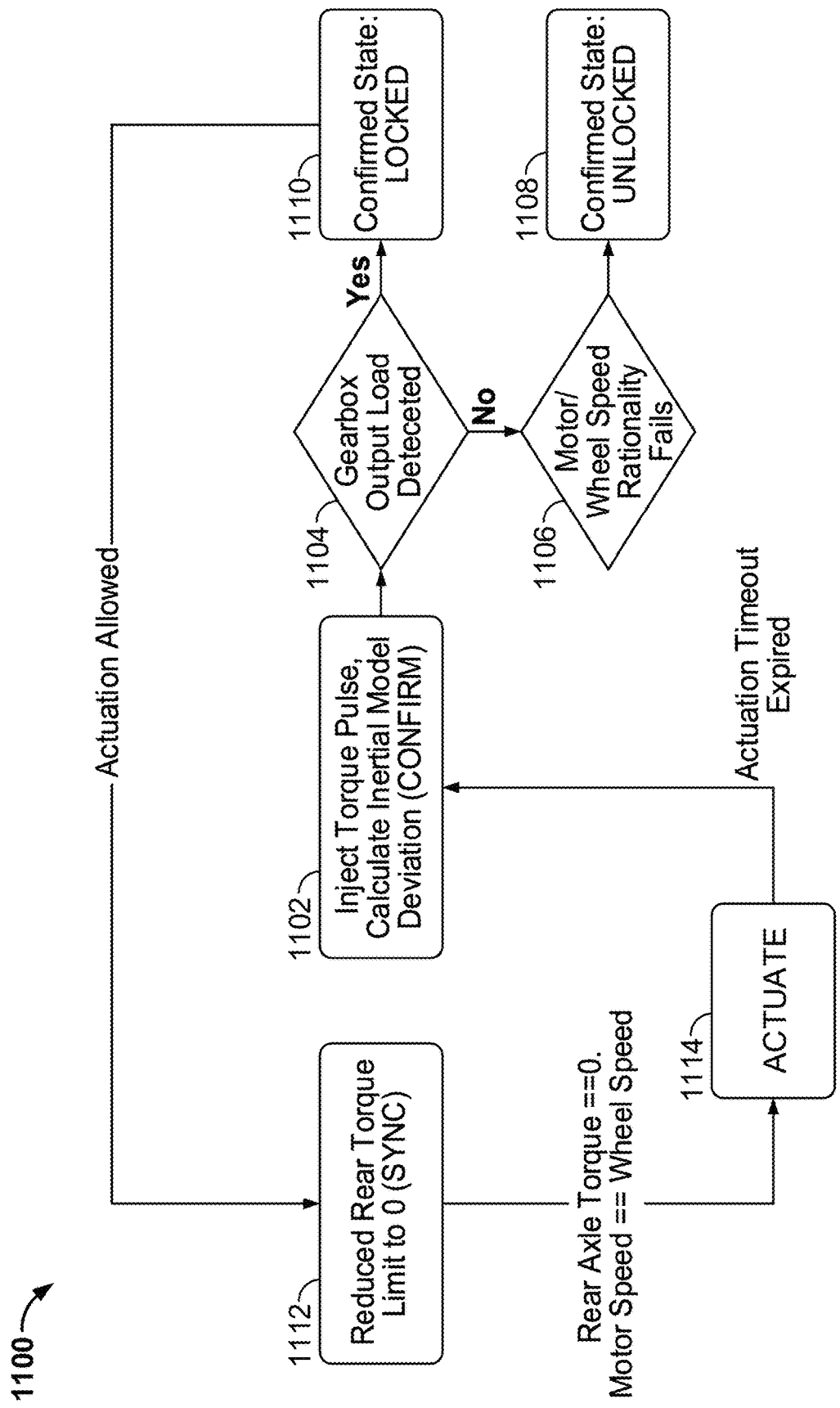
FIG. 11 shows a flowchart of illustrative steps for a state confirmation diagnostic of the unlocked state, in accordance with some embodiments of the present disclosure.

FIG. 11 shows a flowchart of illustrative steps for a state confirmation diagnostic of the unlocked state, in accordance with some embodiments of the present disclosure. The process 1100 may be executed by processing circuitry 306 (e.g., the vehicle dynamics module) located in control system 302 (corresponding to control system 110 of FIG. 1) of the vehicle. In some embodiments, linear translator 304 may receive commands from processing circuitry 306 and initiate the disconnect between pocket plate 402 and notch plate 406 (e.g., the two-way CMD clutches). It will be understood that process 1100, and any step thereof, may be altered to any suitable configuration, including modifications to any of the steps themselves.

The process 1100 begins in between step 1110 and step 1112, where actuation is allowed, and the control system proceeds to step 1112 after determining the disconnect is in a "Locked" state. To unlock the two-way CMD clutches, the control system synchronizes the respective speeds of the motor assembly and wheel at 1112 (e.g., reduces the rear driveline torque to zero), actuates the clutches at 1114 (e.g., disengages the struts of the pocket plate from the notches of the notch plate), and performs an intrusive diagnostic at 1102 in the gearbox to introduce (or attempt to introduce) a speed mismatch between the motor assembly and wheel. An intrusive diagnostic may consist of, for example, a torque pulse that will cause a violation of the BPU threshold as discussed above within a short amount of time (e.g., 100 ms or less). In some embodiments, based on the inboard-inertial model, a 10 Nm torque pulse will result in a violation of a 52 motor rad/s BPU threshold in roughly 94 milliseconds. If the motor assembly and wheel speeds match (e.g., a load is detected on the output shaft of the gearbox at 1104), the control system determines the outboard and inboard clutches are mechanically locked at 1110 and another attempt to unlock the clutches may be made (e.g., repeating steps 1112, 1114, and 1102). However, if the control system detects a motor speed runaway at 1106 (e.g., the motor speed differs greatly from the wheel speed), the control system determines the outboard and inboard clutches are unlocked at 1108.

Figure 12:
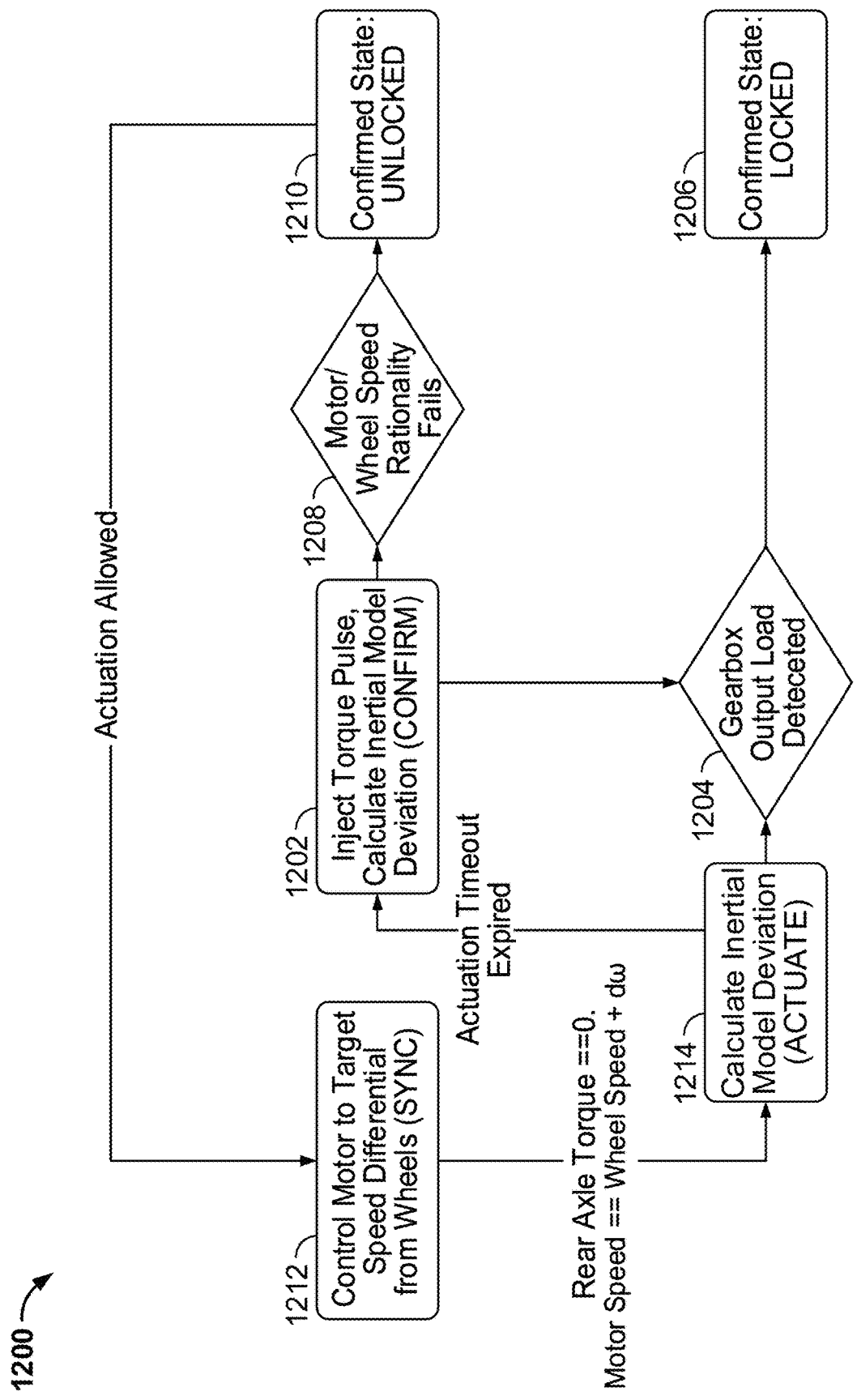
FIG. 12 shows a flowchart of illustrative steps for a state confirmation diagnostic of the locked state, in accordance with some embodiments of the present disclosure.

FIG. 12 shows a flowchart of illustrative steps for a state confirmation diagnostic of the locked state, in accordance with some embodiments of the present disclosure. The process 1200 may be executed by processing circuitry 306 (e.g., the vehicle dynamics module) located in control system 302 (corresponding to control system 110 of FIG. 1) of the vehicle. In some embodiments, linear translator 304 may receive commands from processing circuitry 306 and initiate the disconnect between pocket plate 402 and notch plate 406 (e.g., the two-way CMD clutches). It will be understood that process 1200, and any step thereof, may be altered to any suitable configuration, including modifications to any of the steps themselves.

The process 1200 begins at step 1210, where the control system determines the outboard and inboard clutches are unlocked. The unlocked state may be entered due to a discrepancy between wheel speed and motor assembly speed during locking or after the disconnect is successfully unlocked. While in the unlocked state, actuation of locking is allowed. In response to a locking actuation, the control system will attempt to lock the outboard and inboard clutches by entering the transient state, which includes synchronizing the respective speeds of the motor assembly and the wheel at 1212 (e.g., matching the respective speeds of the motor assembly and wheel so that their difference is below a speed delta threshold), actuating the outboard and inboard clutches to engage and monitoring an inertial model deviation at 1214 (e.g., the torque pulse), and, optionally, injecting a torque pulse at 1202 to determine if there's a load on the output shaft of the gearbox. If the motor assembly and wheel speeds match, and a load is additionally detected on the output shaft of the gearbox at 1204, the control system determines the outboard and inboard clutches are mechanically locked at 1206. If, in response to the injected torque pulse at 1202, the control system detects a motor assembly speed runaway at 1208, the control system determines the outboard and inboard clutches are unlocked at 1210. When locking the clutch plates, a closed-loop speed controller (such as/similar to the one described above) may be used to control the motor speed to a target differential from the wheel speed, as shown in FIG. 10, during the speed synchronization phase. Then, while actuating the clutches at 1214, the inertial model deviation, with optional high-pass filtering to isolate driveline dynamics, may be calculated to detect when the clutches become mechanically coupled, at 1204. This passive load-detection method, if successful, will allow the logic to skip the confirmation phase 1202, leading to a less perceivable jerk and a faster transition to, for example, all-wheel drive (AWD). However, if the inertial model deviation remains small during the actuation phase at 1214, the output load detection logic will continue to the confirmation phase at 1202.

Figure 13:
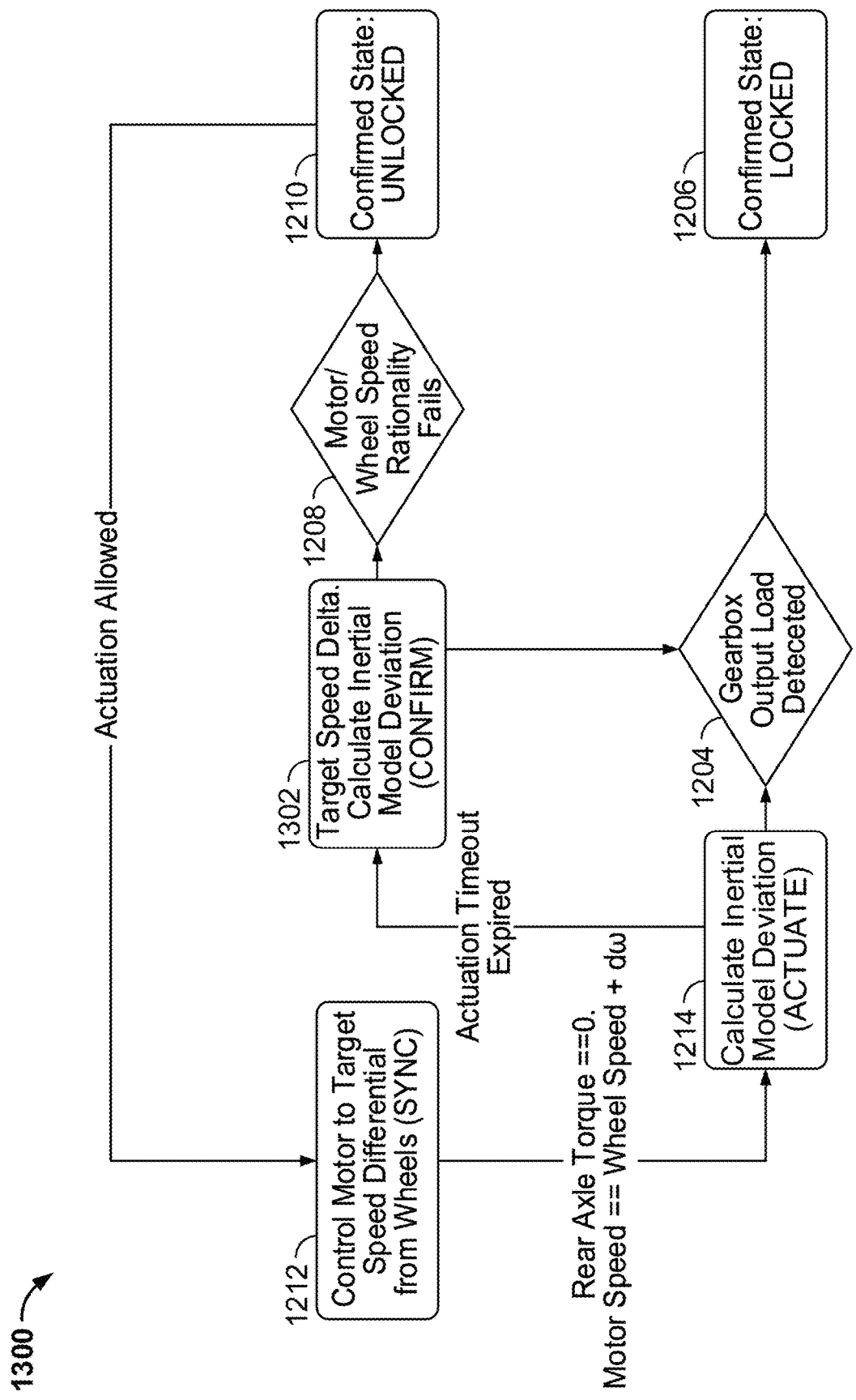
FIG. 13 shows a flowchart of illustrative steps for a state confirmation diagnostic of the locked state, in accordance with some embodiments of the present disclosure.

FIG. 13 shows a flowchart of illustrative steps for a state confirmation diagnostic of the locked state, in accordance with some embodiments of the present disclosure. The steps of the flowchart of FIG. 12 are depicted in the flowchart of FIG. 13, except that the confirmation phase in FIG. 13 includes control system 302 (corresponding to control system 110 of FIG. 1) controlling the speed of the motor assembly (e.g., using a closed-loop PID controller) to a target speed delta between the respective speeds of the motor assembly and wheel at 1302. If the difference between the respective speeds of the motor assembly and wheel are greater than the target speed delta at 1208, control system 302 determines that the outboard and inboard clutches are unlocked at 1210 and returns to the speed synchronization phase at 1212 of the transient state. Contrarily, if the difference between the respective speeds of the motor assembly and wheel remains below the target speed delta, control system 302 will monitor for the presence of a load on the output shaft of the gearbox (e.g., using a reduced-order observer). If a load is detected at 1204, control system 302 determines that the outboard and inboard clutches are locked at 1206. It will be understood that any suitable target speed delta may be used.

Figure 14:
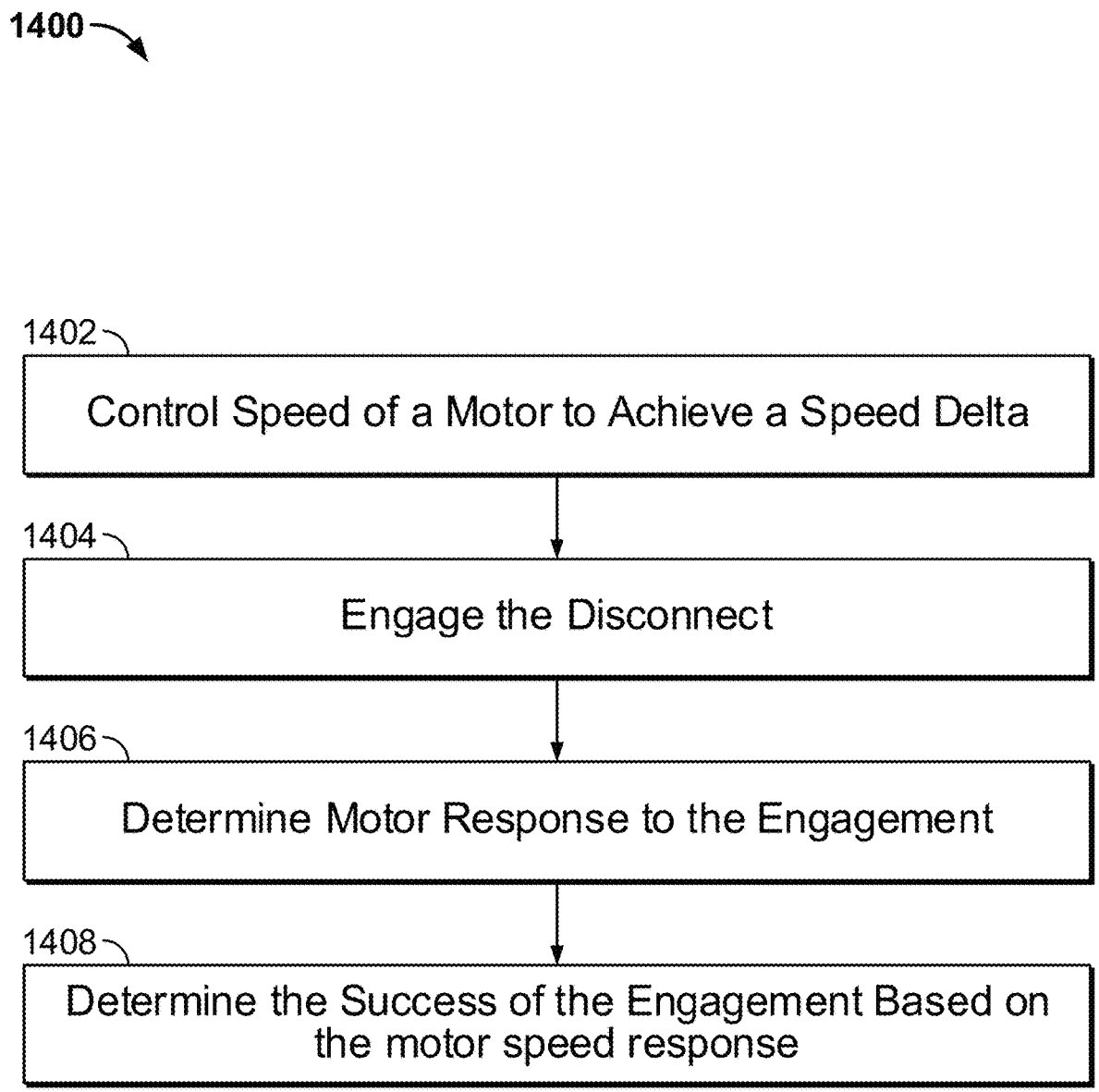
FIG. 14 shows a flowchart of illustrative steps for engaging and accurately determining the state of the two-way controllable mechanical diode clutches, in accordance with some embodiments of the present disclosure.

FIG. 14 shows a flowchart of illustrative steps for engaging and accurately determining the state of the two-way controllable mechanical diode clutches, in accordance with some embodiments of the present disclosure. The process 1400 may be executed by processing circuitry 306 (e.g., the vehicle dynamics module) located in control system 302 (corresponding to control system 110 of FIG. 1) of the vehicle. In some embodiments, linear translator 304 may receive commands from processing circuitry 306 and initiate the disconnect between pocket plate 402 and notch plate 406 (e.g., the two-way CMD clutches). It will be understood that process 1400, and any step thereof, may be altered to any suitable configuration, including modifications to any of the steps themselves.

The process 1400 begins at step 1402, where the control system, via the speed controller, controls the motor speed to achieve a speed delta (e.g., within 20 RPM) with respect to a corresponding wheel speed (i.e., speed synchronization). In some embodiments, this may include the control system reducing a propulsive torque of a rear driveline to zero or close to zero. The motor assembly, via the driveline, may couple to a disconnect, which includes the outboard and inboard clutches (e.g., pocket and notch plates). In some embodiments, the notch plate may correspond to the speed of the gearbox motor assembly, while the pocket plate may correspond to the speed of the half-shaft and wheel. It will be understood that the orientation of the clutches may be switched so that the notch plate may correspond to the speed of the half-shaft and wheel, while the pocket plate may correspond to the speed of the gearbox and motor assembly. Once the respective speeds of the motor assembly and wheel match to within the speed delta, the control system engages the disconnect at 1404. In some embodiments, the engagement of the disconnect at 1404 includes enabling the H-bridge, which controls the bi-directional motion of the coupled linear actuator, to actuate the disconnect towards a desired position (e.g., the struts of the pocket plate engaging with the notches of the notch plate). In some embodiments, the control system continues to synchronize the speeds of the motor assembly and wheel while the engagement of the disconnect takes place. At step 1406, the control system detects the response of the motor assembly speed to motor torque during the engagement. In some embodiments, the motor response includes monitoring speed-matching results between the motor assembly and a corresponding wheel during engagement and/or in response to a torque pulse. At step 1408, the control system determines the success of the engagement based on the motor speed response. If the speed of the motor assembly differs significantly from the speed of the wheel, the control system determines the engagement of the disconnect 1404 is unsuccessful. Contrarily, if the speed of the motor assembly matches the speed of the wheel and a load is detected on the gearbox output, the control system determines the engagement of the disconnect at 1404 is successful.

Figure 15:
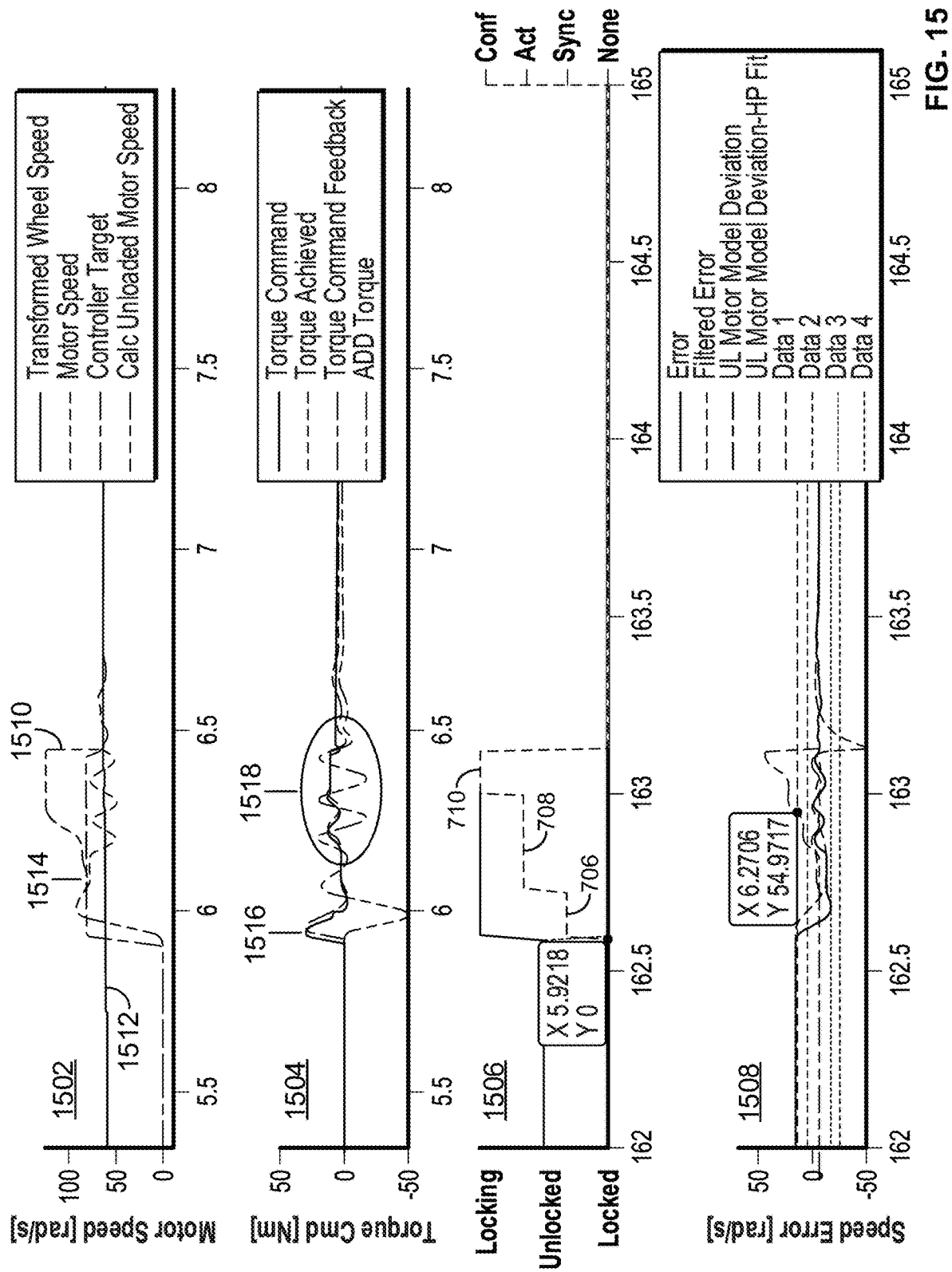
FIG. 15 shows an example diagram depicting the confirmation diagnostic performance in a low-speed environment, in accordance with some embodiments of the present disclosure.

FIG. 15 shows an example diagram depicting the confirmation diagnostic performance in a low-speed environment, in accordance with some embodiments of the present disclosure. For example, the diagram depicted in FIG. 15 may display the confirmation diagnostic performance with a 20 rad/s motor/wheel speed differential at a speed of 5 mph. Plot 1502 shows the engagement of the disconnect in the rear driveline, where the motor speed 1510 matches the transformed wheel speed 1512 at 1514, representing the struts of pocket plate 402 locking with the notches of notch plate 406. This notably aligns with actuation phase 708 of plot 1506. Plot 1504 shows a torque command 1516, delivered by the control system at the beginning of speed synchronization stage 706, to engage the two-way CMD clutches (e.g., pocket plate 402 and notch plate 406), and plot 1504 later depicts a second torque command 1518, which serves to maintain the speed differential between the clutch plates after they've engaged. Plot 1506 shows the disconnect states before, during, and after the locking scenario and the different stages (e.g., speed synchronization 706, actuation 708, and confirmation 710) of locking. Plot 1508 shows the measured difference between the respective speeds of the motor assembly and wheel, along with a predicted (e.g., using an unloaded inertia model) difference corresponding to the torque produced by the motor. The confirmation phase 710 notably aligns with the deviation of the predicted and measured difference in plot 1508.

Figure 16:
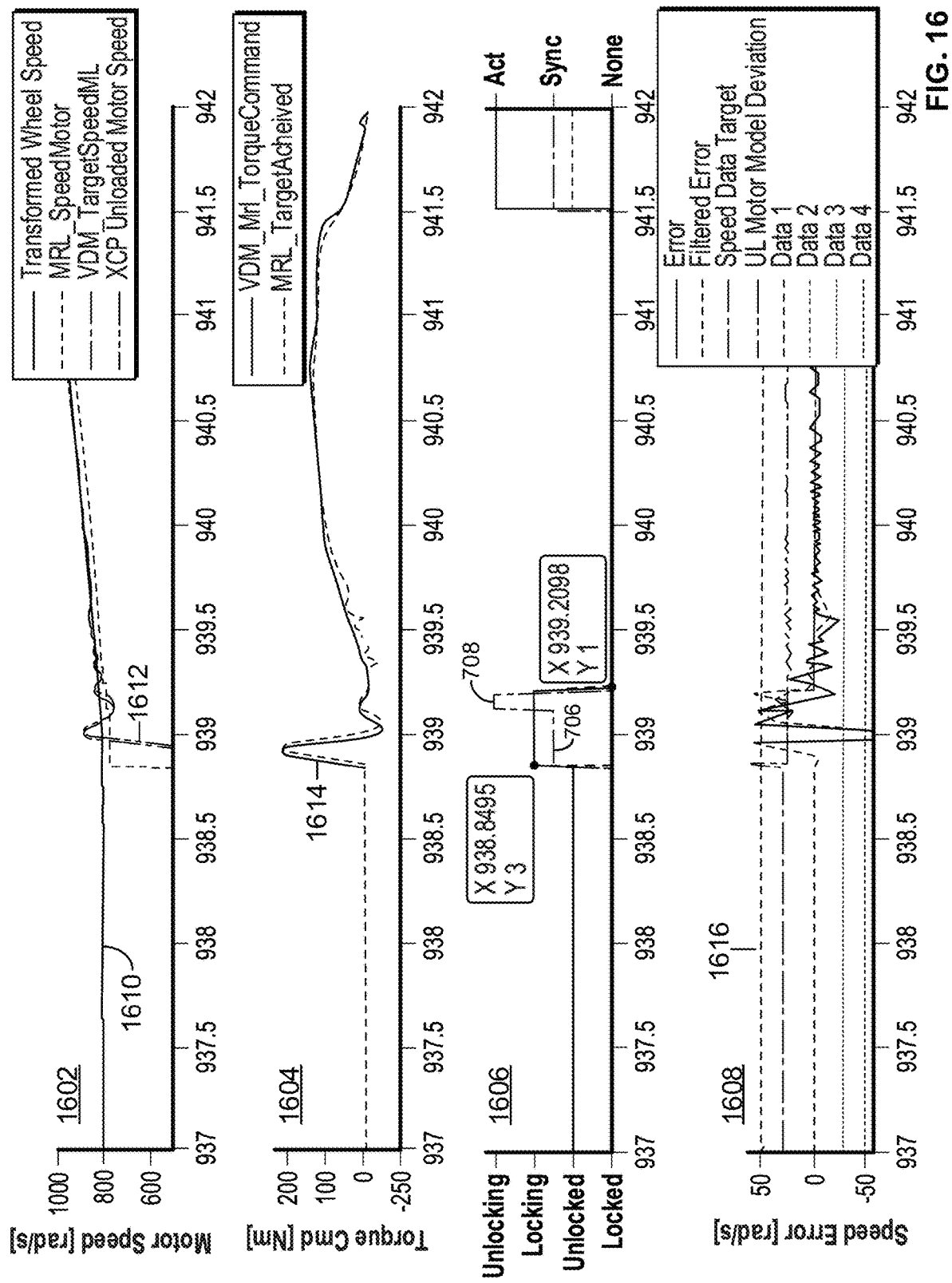
FIG. 16 shows an example diagram depicting a high-speed engagement event, in accordance with some embodiments of the present disclosure.

FIG. 16 shows an example diagram depicting a high-speed engagement event, in accordance with some embodiments of the present disclosure. A high-performance algorithm includes calibration refinements to quickly detect and react to the "snap" or "jolt" in the motor speed when the disconnect engages. The engagement event depicted in FIG. 16, which occurs at 60 miles-per-hour, takes approximately 160 milliseconds from the initial engagement request to confirming the "Locked" state. However, it will be understood that the actual amount of time may depend on the relative angular positions of the struts of the pocket plate relative to the notches of the notch plate at the moment the linear translator reaches the fully-engaged position. For example, the same engagement shown in FIG. 16 may take up to 600 milliseconds depending on initial angular offsets. In plot 1602, the motor speed 1612 rapidly increases from 0 radians/second (i.e., standstill) to above 800 radians/second due to a torque command 1614 depicted in plot 1604. When the motor speed 1612 is synchronized with the transformed wheel speed 1610 within an allowable speed delta, the control system proceeds to engage the CMD clutches and maintain the speed delta during actuation. The motor speed 1612 proceeds to match with transformed wheel speed 1610, while the predicted and measured motor speeds abruptly deviate as shown in plot 1608, which confirms the inboard and outboard clutches are in the "Locked" state. Plot 1606 shows the disconnect states before, during, and after the locking scenario and the different stages (e.g., speed synchronization 706 and actuation 708) of locking. As depicted by plot 1606, the short amount of time the disconnect spends at the actuation phase 708 signifies a quick engagement of the clutch plates. Plot 1608 shows the measured and predicted speed deltas between the motor assembly and wheel, which includes an abrupt deviation (e.g., confirmation of the "Locked" state) in a high pass filtered signal. Plot 1608 additionally includes a Best Possible Unacceptable (BPU) threshold 1616, which represents the maximum instantaneous error the control system will allow.

In some embodiments, determining the ideal speed delta for confirmation requires a trade-off between two conflicting requirements:

1. Confirmation duration: As shown in FIG. 4A and FIG. 4B, a notch plate may include 15 notches. Therefore, once the struts of the pocket plate are fully extended, the worse-case relative angular displacement between the clutches before each strut engages in the closest notch will be $2*\pi/15$ radians. When transformed to motor units (assuming a gear reduction of 12.6), this corresponds to 5.28 radians, or 84% of a full motor revolution. To keep the worst-case confirmation time under acceptable limits, for e.g. 300 milliseconds, the speed delta must have a minimum magnitude of 5.28 radians/0.3 seconds=17.59 radians/second.
2. Perceptible Vehicle-Label Jerk: Higher speed delta magnitudes will result in higher momentum transfer during the confirmation state, which will manifest itself as a more severe vehicle-level jerk. Therefore, at low speeds (e.g., 15 miles-per-hour and lower) with low vehicle acceleration, a 15 radians/second or higher speed delta will cause the disconnect lock events to produce a very noticeable and audible clunk and jerk.

In some embodiments, two calibrated speed-delta targets may be stored—one for high power (e.g., high speed and/or torque) and one for low power (e.g., low speed and/or torque), as follows:

1. A high-power speed delta of 25 radians/second is used for engagements during acceleration maneuvers, where responsiveness and short engagement duration are prioritized and the signal-to-noise ratio for the engagement jerk is low.
2. For other scenarios (e.g., engagements during deceleration, or drive mode changes), a low-power speed delta of 10 radians/second is used to reduce the signal-to-noise ratio for the engagement jerk while extending the duration of the confirmation phase.

Figure 17:
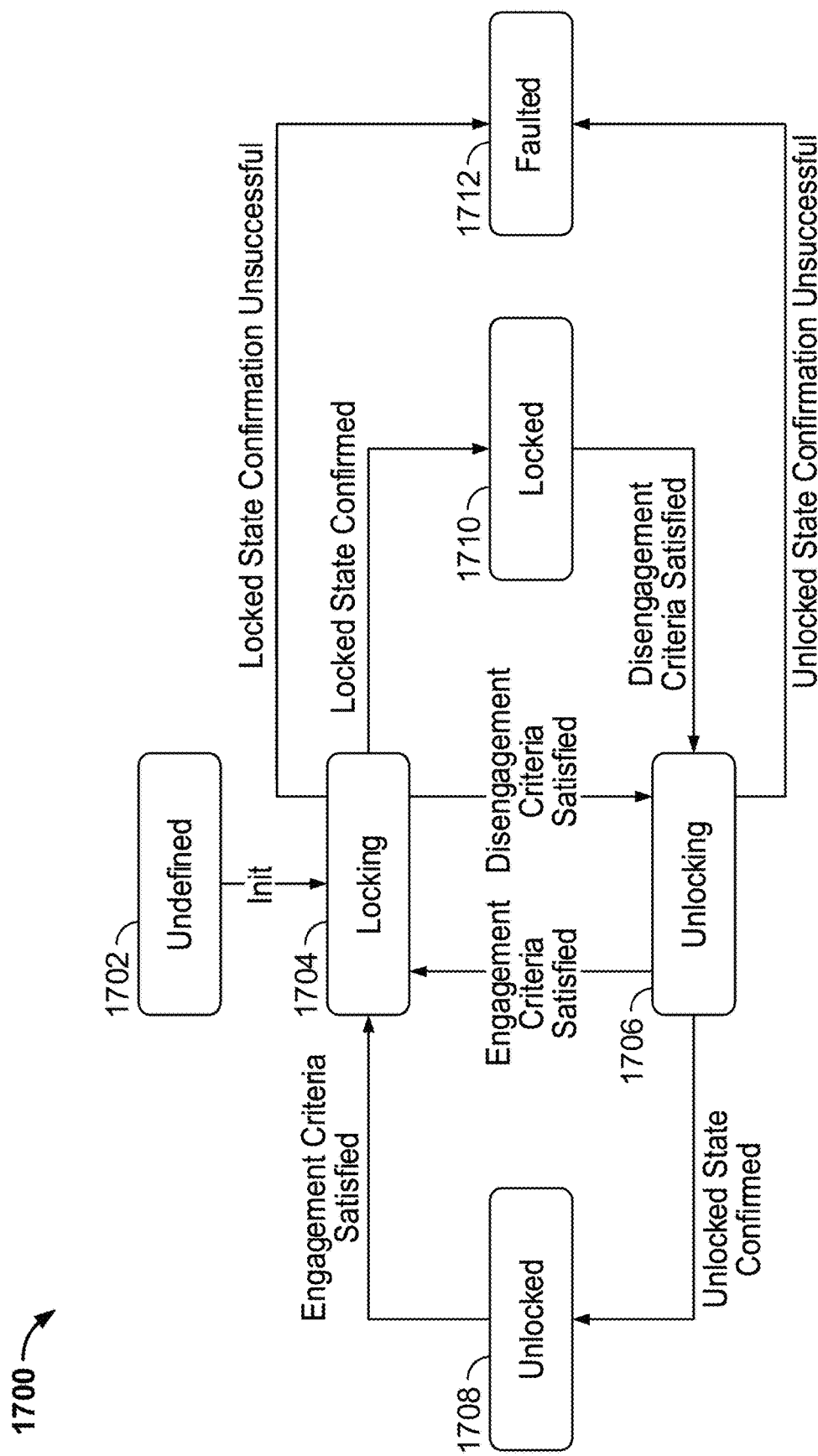
FIG. 17 shows a flowchart of illustrative steps for a disconnect controller state machine, in accordance with some embodiments of the present disclosure.

FIG. 17 shows a flowchart of illustrative steps for a disconnect controller state machine, in accordance with some embodiments of the present disclosure. The process 1700 may be executed by processing circuitry 306 (e.g., the vehicle dynamics module) located in control system 302 of the vehicle. In some embodiments, linear translator 304 may receive commands from processing circuitry 306 and initiate the disconnect controller. It will be understood that process 1700, and any step thereof, may be altered to any suitable configuration, including modifications to any of the steps themselves.

The process 1700 begins at step 1702, where the control system has yet to determine the state of the disconnect (e.g., locked or unlocked), therefore being labeled as "Undefined." In the instance the control system confirms the disconnect is in a "Locked" state, the control system proceeds to step 1710. At step 1706, the control system determines that disengagement criteria have been satisfied for unlocking the disconnect (e.g., Front-Wheel Drive mode requested by the driver or by upstream control logic to extend range). At step 1708, the control system unlocks the disconnect using the control logic and intrusive state-detection methods described in this disclosure. At step 1704, the control system determines that engagement criteria have been satisfied for locking the disconnect (e.g., All-Wheel Drive mode requested by the driver or by an upstream control logic to provide higher acceleration). At step 1710, the control system locks the disconnect, using the control logic and intrusive state-detection methods described in this disclosure. In some embodiments, while in the "Locking" state at 1704, the control system may determine the "Locked" state confirmation is unsuccessful (e.g., a torque command results in a motor speed runaway), which results in the control system determining the disconnect has "Faulted" at 1712. Similarly, while in the "Unlocking" state at 1706, the control system may determine the "Unlocked" state confirmation is unsuccessful (e.g., the torque command results in matched speeds between the motor assembly and wheel, or a load detection on the gearbox output), which results in the control system determining the disconnect has "Faulted" at 1712. In some embodiments, while in the "Locking" state at 1704, a disengagement may be requested (e.g., due to a change-of-mind by the driver), in which case process 1700 proceeds to the "Unlocking" state at 1706. Contrarily, while in the "Unlocking" state at 1706, an engagement may be requested (e.g., due to a change-of-mind by the driver), in which case process 1700 proceeds to the "Locking" state at 1704.

In some embodiments, disconnect actuations may be tracked over time for a vehicle. For example, the number of actuations as well as metrics from the actuations (e.g., locking failures) may be stored or accumulated to track wear and for diagnostics. Notch plates may be susceptible to wear, when for example, torque is applied to a partially engaged strut.

Figure 18:
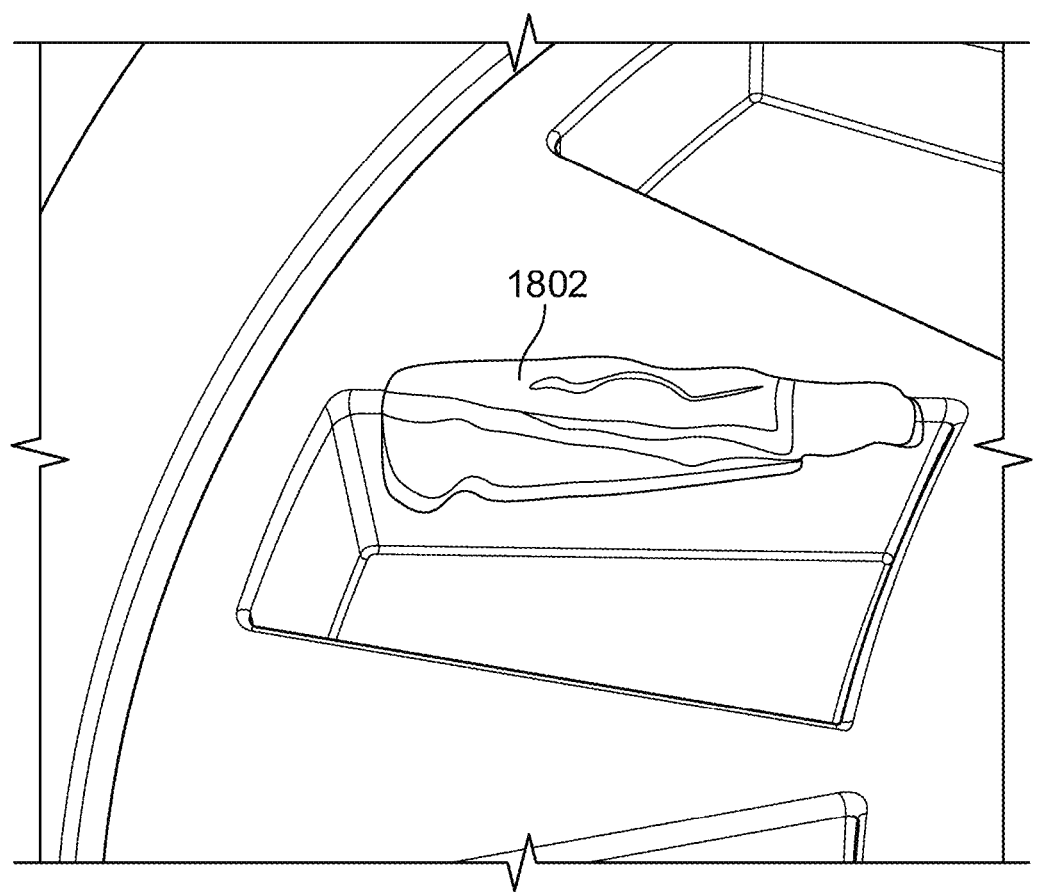
FIG. 18 shows an illustrative notch showing signs of wear, in accordance with some embodiments of the present disclosure.

FIG. 18 shows an illustrative notch showing signs of wear, in accordance with some embodiments of the present disclosure. A notch 1802 shows signs of wear on the chamfered edge 1804 of the notch 1802. Repeated partial engagements may result in this type of wear, which in turn may deposit debris in the notch 1802 and increase the probability of more partial engagements in the future by preventing struts from fully locking into the notch 1802. This type of wear may be reduced by appropriately choosing the speed delta (e.g., a negative locking speed delta). The techniques and logic of the present disclosure reduce the probability of partial engagements of the struts that will transmit torque in the intended drive direction and ensure that they always achieve full engagement, which may be achieved by locking the clutches at a speed differential that is the opposite direction of the intended torque delivery. This negative speed differential causes the opposing strut-set to be the first to catch on the notch plate and transmit a load. Meanwhile, the strut-set that is intended to transmit propulsive torque will remain unloaded and be able to fully extend into the notches.

In some embodiments, vehicle storage (e.g., a 16-byte space in memory) is used to track the number of locking and unlocking events over a vehicle's lifetime. In some embodiments, each count (e.g., rear-left lock, rear-left unlock, rear-right lock, and rear-right unlock) occupies 4 bytes, allowing the tracking of up to 4.29 billion actuations. In some embodiments, an "actuation" is defined as a current pulse to the linear actuator, followed by a confirmation phase (if applicable). Therefore, if multiple actuation attempts occur during a transition to a given target state, these will be individually counted. The lock counts for each disconnect may be transmitted to diagnostic equipment or to remote storage for vehicle fleet evaluation.

The foregoing is merely illustrative of the principles of this disclosure and various modifications may be made by those skilled in the art without departing from the scope of this disclosure. For example, in some embodiments, actuation delay may be improved by overlapping the end of speed matching with the beginning of actuation. As another example, the confirmation phase may be modified to use an unloaded reference (e.g., integrate motor torque feedback) compared with measured motor speed. As yet another example, the confirmation phase may be replaced with a slow ramp-in of torque.

The foregoing methods, control logic, and/or flowcharts may be implemented using processing circuitry (e.g., control system 110 or 302). In some embodiments, a vehicle may comprise the processing circuitry. In some embodiments, the processing circuitry may comprise a processor and memory. The processor may comprise a hardware processor, a software processor (e.g., a processor emulated using a virtual machine), or any combination thereof. In some embodiments, the processor and memory in combination may be referred to as processing circuitry or control circuitry of the vehicle. In some embodiments, the processor alone may be referred to as the processing circuitry or control circuitry of the vehicle. The memory may comprise hardware elements for non-transitory storage of commands or instructions, that, when executed by the processor or processing circuitry, cause the processor or processing circuitry to operate one or more disconnects in accordance with present disclosure described above and below. The processing circuitry may be communicatively connected to one or more sensors (e.g., motor speed sensors and wheel speed sensors) and may be communicatively coupled to apply torque commands to one or more motors and actuation commands to one or more disconnects.

The above described embodiments are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for engaging a driveline disconnect associated with a vehicle, comprising:
 determining a target motor speed based on a wheel speed and a speed delta;
 controlling, via a control system associated with the vehicle, a motor speed, associated with a motor assembly, to achieve the target motor speed;
 facilitating, via the control system, an engagement of the driveline disconnect to couple the motor assembly with a corresponding wheel;
 monitoring, via the control system, the motor speed, associated with the motor assembly, in response to the engagement of the driveline disconnect; and
 determining, via the control system, that the engagement of the driveline disconnect is successful based on a motor speed response.

2. The method of claim 1, wherein determining that the engagement is successful based on the motor speed response comprises determining that the engagement is successful when the motor speed response indicates a presence of a load connected to the driveline disconnect.

3. The method of claim 2, further comprising determining the speed delta based on a vehicle speed.

4. The method of claim 3, wherein determining the speed delta based on the vehicle speed comprises:
 comparing the vehicle speed to a threshold;
 when the vehicle speed is below the threshold, selecting a first speed delta as the speed delta; and
 when the vehicle speed is above the threshold, selecting a second speed delta as the speed delta, wherein the second speed delta is greater than the first speed delta.

5. The method of claim 1, wherein determining that the engagement of the driveline disconnect is successful comprises:
- determining that the motor speed response does not indicate a successful engagement;
- applying a torque impulse to the motor assembly;
- determining an impulse motor speed response to the torque impulse; and
- determining that the engagement is successful based on the impulse motor speed response.

6. The method of claim 5, wherein determining that the engagement is successful based on the impulse motor speed response comprises determining that the engagement is successful when the impulse motor speed response indicates a presence of a load connected to the driveline disconnect.

7. The method of claim 1, further comprising applying a diagnostic threshold to determine when the motor speed achieves the target motor speed corresponding to the speed delta.

8. The method of claim 7, wherein the diagnostic threshold represents a maximum allowable steady-state error corresponding to the target motor speed and the motor speed that is controlled.

9. The method of claim 7, wherein applying the diagnostic threshold is based on a size of an error in the motor speed.

10. The method of claim 1, further comprising receiving the wheel speed.

11. The method of claim 10, wherein the target motor speed corresponds to a speed less than the wheel speed.

12. The method of claim 1, further comprising:
- determining whether the motor speed and the corresponding wheel speed are well-correlated,
- wherein determining whether the engagement is successful is further based on determining whether the motor speed and the corresponding wheel speed are well-correlated.

13. The method of claim 1, wherein facilitating the engagement of the driveline disconnect to couple the motor assembly with the corresponding wheel comprises actuating struts of a pocket plate to engage with notches of a notch plate.

14. A system for engaging a driveline disconnect associated with a vehicle, comprising:
- a motor;
- a sensorless disconnect; and
- processing circuitry configured to:
  - determine a target motor speed based on a wheel speed and a speed delta;
  - control a motor speed, associated with a motor assembly, to achieve the target motor speed;
  - facilitate an engagement of the sensorless disconnect to couple the motor assembly with a corresponding wheel;
  - monitor the motor speed, associated with the motor assembly, in response to the engagement of the sensorless disconnect; and
  - determine that the engagement of the sensorless disconnect is successful based on a motor speed response.

15. The system of claim 14, wherein the processing circuitry is further configured to determine the speed delta based on a vehicle speed.

16. The system of claim 15, wherein the processing circuitry is configured to determine the speed delta based on the vehicle speed by:
- comparing the vehicle speed to a threshold;
- when the vehicle speed is below the threshold, selecting a first speed delta as the speed delta; and
- when the vehicle speed is above the threshold, selecting a second speed delta as the speed delta, wherein the second speed delta is greater than the first speed delta.

17. The system of claim 14, wherein the processing circuitry is configured to determine that the engagement is successful by:
- determining that the motor speed response does not indicate a successful engagement;
- applying a torque impulse to the motor;
- determining an impulse motor speed response to the torque impulse; and
- determining that the engagement is successful based on the impulse motor speed response.

18. The system of claim 14, wherein the processing circuitry is further configured to receive the wheel speed.

19. The system of claim 14, wherein facilitating the engagement of the sensorless disconnect to couple the motor assembly with the corresponding wheel comprises actuating struts of a pocket plate to engage with notches of a notch plate.

20. A vehicle, comprising:
- a first motor coupled to a first wheel via a first disconnect;
- a second motor coupled to a second wheel via a second disconnect; and
- processing circuitry configured to:
  - determine a target motor speed based on a wheel speed and a speed delta;
  - control a motor speed of the first or the second motor to achieve the target motor speed;
  - facilitate an engagement of the first or the second disconnect to couple the first motor with the first wheel or the second motor with the second wheel;
  - monitor the motor speed of the first or the second motor in response to the engagement of the first or the second disconnect; and
  - determine that the engagement of the first or the second disconnect is successful based on a motor speed response.

21. The vehicle of claim 20, wherein the first wheel comprises a rear left wheel of the vehicle and the second wheel comprises a rear right wheel of the vehicle.

22. The vehicle of claim 20, wherein the processing circuitry is configured to engage the first disconnect and the second disconnect in response to the vehicle transitioning to four-wheel drive.

* * * * *